(12) United States Patent
Ma

(10) Patent No.: US 9,347,690 B2
(45) Date of Patent: May 24, 2016

(54) METHODS AND SYSTEMS FOR CONCENTRATED SOLAR POWER

(71) Applicant: ALLIANCE FOR SUSTAINABLE ENERGY, LLC, Golden, CO (US)

(72) Inventor: Zhiwen Ma, Golden, CO (US)

(73) Assignee: ALLIANCE FOR SUSTAINABLE ENERGY, LLC, Golden, CO (US)

( * ) Notice: Subject to any disclaimer, the term of this patent is extended or adjusted under 35 U.S.C. 154(b) by 321 days.

(21) Appl. No.: 13/855,088

(22) Filed: Apr. 2, 2013

(65) Prior Publication Data

US 2013/0257056 A1   Oct. 3, 2013

Related U.S. Application Data

(60) Provisional application No. 61/619,317, filed on Apr. 2, 2012, provisional application No. 61/715,747, filed on Oct. 18, 2012, provisional application No. 61/715,751, filed on Oct. 18, 2012, provisional application No. 61/715,755, filed on Oct. 18, 2012.

(51) Int. Cl.
*F24J 2/34* (2006.01)
*F24J 2/42* (2006.01)
(Continued)

(52) U.S. Cl.
CPC ........... *F24J 2/4649* (2013.01); *E02D 27/38* (2013.01); *E04H 7/26* (2013.01); *F03G 6/065* (2013.01);
(Continued)

(58) Field of Classification Search
CPC ............. F24J 2/07; F24J 2/42; F24J 2/34; F24J 2/4649; F24J 2/48; Y02E 10/41; Y02E 10/46; Y02E 10/44; Y02E 60/142; F28D 2021/0045; F28D 20/0056; F28D 13/00; F28C 3/10; F28C 3/12
See application file for complete search history.

(56) References Cited

U.S. PATENT DOCUMENTS 4,030,477 A   6/1977 Smith
4,116,222 A   9/1978 Seifried
(Continued)

FOREIGN PATENT DOCUMENTS

WO   2010029411 A2   3/2010
WO   2010144554 A1   12/2010

OTHER PUBLICATIONS

Agrafiotis, C., et al., "Evaluation of porous silicon carbide monolithic honeycombs as volumetric receivers/ collectors of concentrated solar radiation," Solar Energy Materials & Solar Cells 91 (2007) 474-488.
(Continued)

*Primary Examiner* — Kenneth Bomberg
*Assistant Examiner* — Wesley Harris
(74) *Attorney, Agent, or Firm* — John C. Stolpa; Michael A. McIntyre

(57) ABSTRACT

Embodiments described herein relate to a method of producing energy from concentrated solar flux. The method includes dropping granular solid particles through a solar flux receiver configured to transfer energy from concentrated solar flux incident on the solar flux receiver to the granular solid particles as heat. The method also includes fluidizing the granular solid particles from the solar flux receiver to produce a gas-solid fluid. The gas-solid fluid is passed through a heat exchanger to transfer heat from the solid particles in the gas-solid fluid to a working fluid. The granular solid particles are extracted from the gas-solid fluid such that the granular solid particles can be dropped through the solar flux receiver again.

17 Claims, 34 Drawing Sheets

(51) Int. Cl.
| | |
|---|---|
| F24J 2/28 | (2006.01) |
| F24J 2/48 | (2006.01) |
| F24J 2/07 | (2006.01) |
| F28D 13/00 | (2006.01) |
| F28C 3/10 | (2006.01) |
| F28C 3/12 | (2006.01) |
| E02D 27/38 | (2006.01) |
| E04H 7/26 | (2006.01) |
| F24J 2/46 | (2006.01) |
| F28D 20/00 | (2006.01) |
| F03G 6/06 | (2006.01) |
| H02K 7/18 | (2006.01) |
| F28D 21/00 | (2006.01) |

(52) U.S. Cl.
CPC .... *F24J 2/07* (2013.01); *F24J 2/28* (2013.01); *F24J 2/34* (2013.01); *F24J 2/42* (2013.01); *F24J 2/48* (2013.01); *F28C 3/10* (2013.01); *F28C 3/12* (2013.01); *F28D 13/00* (2013.01); *F28D 20/0056* (2013.01); *H02K 7/1823* (2013.01); *F28D 2020/0047* (2013.01); *F28D 2021/0045* (2013.01); *Y02E 10/41* (2013.01); *Y02E 10/44* (2013.01); *Y02E 10/46* (2013.01); *Y02E 60/142* (2013.01)

(56) References Cited

U.S. PATENT DOCUMENTS

| | | | |
|---|---|---|---|
| 4,117,829 | A | 10/1978 | Gross et al. |
| 4,287,881 | A | 9/1981 | Palazzetti et al. |
| 4,314,549 | A | 2/1982 | Swanson |
| 4,333,445 | A * | 6/1982 | Lee ................... 126/617 |
| 4,338,919 | A * | 7/1982 | Hwang ............. 126/644 |
| 5,245,986 | A | 9/1993 | Karni |
| 5,947,114 | A | 9/1999 | Kribus et al. |
| 7,954,321 | B2 | 6/2011 | Shinnar |
| 7,987,844 | B2 | 8/2011 | Zillmer et al. |
| 2009/0194097 | A1 | 8/2009 | Rabinoff |
| 2009/0277443 | A1* | 11/2009 | Jukkola et al. ............... 126/643 |
| 2010/0303692 | A1 | 12/2010 | Perkins et al. |
| 2011/0067398 | A1 | 3/2011 | Slocum et al. |
| 2011/0067690 | A1 | 3/2011 | Slocum et al. |
| 2011/0209475 | A1 | 9/2011 | Jeter et al. |
| 2011/0239651 | A1 | 10/2011 | Aoyama et al. |
| 2011/0259544 | A1 | 10/2011 | Neti et al. |
| 2011/0314813 | A1 | 12/2011 | Cafri et al. |
| 2012/0216536 | A1 | 8/2012 | Ma et al. |
| 2013/0025192 | A1 | 1/2013 | Wegeng et al. |
| 2013/0255667 | A1 | 10/2013 | Ma et al. |
| 2013/0284163 | A1* | 10/2013 | Flamant et al. ............... 126/634 |
| 2014/0298822 | A1 | 10/2014 | Ma |

OTHER PUBLICATIONS

Gil, A. et al., "Stare of the art on high temperature thermal energy storage for power generation. Part 1—Concepts, materials and modellization," Renewable and Sustainable Energy Reviews 14 (2010) 31-35.

Wu, W., et al., "Direct Absorption Receivers for High Temperatures," URL: http://elib.dir.de/73113/1/SolarPACES2011_WU_DLR.pdf last accessed Apr. 1, 2013.

Siegel, N. et al.,"Development and Evaluation of a Prototype Solid Particle Receiver: On-Sun Testing Model and Validation," Journal of Solar Engineering, May 2010, vol. 132, pp. 021008-1-021008-8.

Roger, M. et al., "Face-Down Solid Particle Receiver Using Recirculation," Journal of Solar Energy Engineering, Aug. 2011, vol. 133, 031009-1-031009-8.

Kunii, D., et al. Fluidization Engineering, 2nd Edition, 1991 by Butterwith-Heinemann, a division of Reed Publishing (USA), Chapter 13, pp. 313-323.

Martin, J., "ASCUAS: A Solar Central Receiver Utilizing a Solid Thermal Carrier," SAND82-8203, Unlimited Release, Printed Jan. 1982.

Kim, K. et al., "A study of solid particle flow characterization in solar particle receiver," Solar Energy 83 (2009) pp. 1784-1793.

Siegel, N., et al., "Design and On-Sun Testing of a Solid Particle Receiver Prototype," Proceedings of ES2008, Energy Sustainability 2008, Aug. 10-14, 2008, Jacksonville, FL USA.

Ma, Z. et al., "Thermal Energy Storage and Its Potential Applications in Solar Thermal Power Plants and Electricity Storage," Proceedings of the ASME 2011 5th International Conference on Energy Sustainability ES2011, Aug. 7-10, 2011, Washington, DC, USA.

Golob, M. et al., "Heat Transfor Coefficient Between Flat Surface and Sand," Proceedings of the ASME 2011 5th International Conference on Energy Sustainability ES2011, Aug. 7-10, 2011, Washington, DC, USA.

Neber, M., "Enhanced Solar Energy Harvest for Power Generation From Brayton Cycle," Proceedings of the ASME International Mechanical Engineering Congress and Exposition, IMECE2011, Nov. 11-17, 2011, Denver, CO, USA.

Kolb, G., "An Evaluation of Possible Next-Generation High-Temperature Molten-Salt Power Towers," Sandia Report SAND2011-9320, Unlimited Release, printed Dec. 2011.

Siegel, R. et al., "Thermal Radiation Heat Transfer," 3rd Edition 1992, 1981, 1972 by Hemisphere Publishing Corporation, pp. 292-297.

Hischier, I. et al., "A Modular Ceramic Cavity-Receiver for High-Temperature High-Concentration Solar Applications," Journal of Solar Energy Engineering, Feb. 2012, vol. 134 pp. 011004-1-011004-6.

Avial-Marin, A., "Volumetric receivers in Solar Thermal Power Plants with Central Receiver System technology: A review," Solar Energy, 85 (2011) 891-910.

Foster Wheeler Corp. http://www.fwc.com/GlobalPlwerGroup/SteamGenerators/CirculatingFluidizedBed.cfm last accessed Apr. 1, 2013.

Contech Systems Ltd., "Introduction to Micropile Design 101," Presentation for Arizona Ram Jack Seminar, Jan. 15, 2010.

Steinfeld, A. et al., "Thermochemical Production of Fuels with Concentrated Solar Energy," Optics Express vol. 18, No. S1, Apr. 26, 2010, pp. A100-A111.

Tamuara, Y., "Converstion of Concentrated Solar Thermal Energy into Chemical Energy," Royal Swedish Academy of Sciences, 2012, pp. 108-111.

Wong, B. et al., "Sulfur Based Thermochemical Energy Storage for Concentrated Solar Power," SolarPACES 2012, Sep. 11-14, 2012, Marrakech, Morocco.

Glatzmaier, G., "Summary Report for Concentrating Solar Power Thermal Storage Workshop," Technical Report NREL/TP-5500-52134, Aug. 2011.

SunShot, U.S. Dept. of Energy, "Particle Receiver Integrated with Fluidized Bed," Website www.solar.energy.gov/sunshot/csp.html, Sep. 2012.

"Thermochemical Heat Storage for Concentrated Solar Power: Thermochemical System Reactor Design for Thermal Energy Storage," Phase II Final Report for the period Sep. 30, 2008 through Apr. 30, 2011, prepared for the U.S. Dept. of Energy by Project Staff of General Atomics, Oct. 2011.

Kavidass, et al., "Why Build a Circulating Fluidized Bed Boiler to General Steam and Electric Power, " presented to POWER-GEN Asia 2000, Sep. 20-22, 2000, Bangkok, Thailand.

"Thermochemical Heat Storage for Concentrated Solar Power Based on Multivalent Metal Oxides," General Atomics, German Aerospace Center Staff, CSP Program Review, May 18, 2011.

"Energy Basics: Power Tower Systems for Concentrating Solar Power," U.S Dept. of Energy, Website www.eere.energy.gov/basics/renewable_energy/power_tower.html, Feb. 28, 2013.

Muller-Steinhagen, H. et al., "Concentrating Solar Power: A Review of the Technology," Quarterly of the Roayl Academy of Engineering, Ingenia 18, Feb./Mar. 2004, pp. 43-50.

(56) References Cited

OTHER PUBLICATIONS

Taylan, O. et al., "Fuel Production Using concentrated Solar Energy," Application of Solar Energy, 2013, pp. 33-67.

Portaspana, J. "High Temperature Thermal Energy Storage Systems Based on Latent and Thermo-Chemical Heat Storage," Master Thesis, Submitted in the Technishcen Universtiat Wien Faculty of Mechanical and Industrial Engineering, Jul. 2011, Vienna, Austria.

Steinfeld, A. "Solar Thermochemical Production of Hydrogen-A Review," Solar Energy, vol. 78, Isssue 5, May 2005, pp. 603-615.

Meier, A. et al., "Solar Fuels from Concentrated Sunlight," IEA SolarPACES Implementing Agreement, Aug. 2009.

Wong, "Lessons Learned: Developing Thermochemical Cycles for Solar Heat Storage Applications," Workshop on TES for CSP, Jan. 8, 2013.

* cited by examiner

METHODS AND SYSTEMS FOR CONCENTRATED SOLAR POWER

CROSS-REFERENCE TO RELATED APPLICATIONS

This application claims priority to and the benefit of:

U.S. Provisional Application No. 61/715,747 entitled "Solid Particle Thermal Energy Storage Design For A Fluidized-Bed Concentrating Solar Power Plant" and filed on Oct. 18, 2012, which is incorporated herein by reference in its entirety;

U.S. Provisional Application No. 61/619,317 entitled "Gas-Solid Two-Phase Heat Transfer Material CSP Systems and Methods" and filed on Apr. 2, 2012, which is incorporated herein by reference in its entirety;

U.S. Provisional Application No. 61/715,751 entitled "Fluidized-Bed Heat Exchanger Designs for Different Power Cycle in Power Tower Concentrating Solar Power Plant with Particle Receiver and Solid Thermal Energy Storage", filed on Oct. 18, 2012, which is incorporated herein by reference in its entirety; and U.S. Provisional Application No. 61/715,755, entitled "Enclosed Particle Receiver Design for a Fluidized Bed in Power Tower Concentrating Solar Power Plant", filed on Oct. 18, 2012, which is incorporated herein by reference in its entirety.

CONTRACTUAL ORIGIN

The United States Government has rights in this invention under Contract No. DE-AC36-08GO28308 between the United States Department of Energy and the Alliance for Sustainable Energy, LLC, the manager and operator of the National Renewable Energy Laboratory.

BACKGROUND

Concentrating Solar Power (CSP) systems utilize solar energy to drive a thermal power cycle for the generation of electricity. CSP technologies include parabolic trough, linear Fresnel, central receiver or "power tower", and dish/engine systems. Considerable interest in CSP has been drive by renewable energy portfolio standards applicable to energy providers in the southwestern United States and renewable energy feed-in tariffs in Spain. CSP systems are typically deployed as large, centralized power plants to take advantage of economies of scale. A key advantage of certain CSP systems, in particular parabolic troughs and power towers, is the ability to incorporate thermal energy storage. Thermal energy storage (TES) is often less expensive and more efficient than electric storage and allows CSP plants to increase capacity factor and dispatch power as needed—for example, to cover evening or other demand peaks.

Current CSP plants typically utilize oil, molten salt or steam to transfer solar energy from a solar energy collection field, tower or other apparatus to the power generation block. These fluids are generally referred to as a "heat transfer fluid" and are typically flowed through a heat exchanger to heat water to steam or to heat an alternative "working fluid" which is then used to drive a turbine and generate electrical power. Commonly utilized heat transfer fluids have properties that in certain instances limit plant performance; for example, synthetic oil heat transfer fluid has an upper temperature limit of 390° C., molten salt has an upper temperature limit of about 565° C. while direct steam generation requires complex controls and allows for limited thermal storage capacity.

Current state-of-the-art two-tank molten salt storage costs are relatively high, and impose temperature limitations upon a practical system. For example, a typical two-tank molten salt storage system will freeze at temperatures under 200° C. and become unstable above 600° C. Proposed single-tank thermocline TES systems have the potential to displace 75% of the expensive molten salt with low cost rocks or pebbles. Even so, the cost of a thermocline TES system will still be high due to the cost of the remaining 25% salt or other required elements such as a stainless steel tank. In addition, molten salt may still limit the highest operating temperature of the overall CSP system for the power generation and thereby limit system efficiency. In addition, TES salt transportation and conditioning can take several months, which negatively impacts capital investment.

The foregoing examples of the related art and limitations related therewith are intended to be illustrative and not exclusive. Other limitations of the related art will become apparent to those of skill in the art upon a reading of the specification and a study of the drawings.

DRAWINGS

Exemplary embodiments are illustrated in referenced figures of the drawings. It is intended that the embodiments and figures disclosed herein are to be considered illustrative rather than limiting.

DETAILED DESCRIPTION

The role of concentrating solar power systems (CSP) in base load energy production will be enhanced if the cost of CSP can be reduced. To achieve this goal, CSP plants should be designed to increase solar-to-electric conversion efficiency and reduce cost of both the energy conversion system and thermal energy storage. Generally, the increase in CSP thermal conversion efficiency is achieved with higher system operating temperatures. Current heat transfer fluids (HTF) of oil and nitrate salt are limited with respect to high temperature stability. Using salt as a heat transfer fluid can also increase cost for storage media and appropriate containers.

Some embodiments disclosed herein introduce a CSP system featuring gas-solid two-phase flow to replace liquid HTF, and also featuring the use of solid particles as a thermal energy storage media. The disclosed systems avoid the low temperature freezing issues of salt, the high temperature instability issues of both salt and oil. Thus, these disclosed embodiments achieve high performance through both high temperature operation and high heat transfer rates. Also disclosed are methods of systems for producing electricity using a CSP utilizing a gas-solid two-phase heat transfer material Some embodiments provide for a CSP receiver configured to heat a heat transfer material (for example, a heat transfer fluid or a flow of granular solid particles) flowing therethrough using thermal radiation emitted from a plurality of open-ended absorbers. The open-ended absorbers are oriented such that solar flux from a reflector field is received into the open end of the absorbers, and is absorbed by the interior surface of the absorbers. The heat transfer material can be flowed in a region proximate the exterior of the absorbers to absorb thermal convention heat transfer and radiation emitted from the absorbers.

Figure 1:
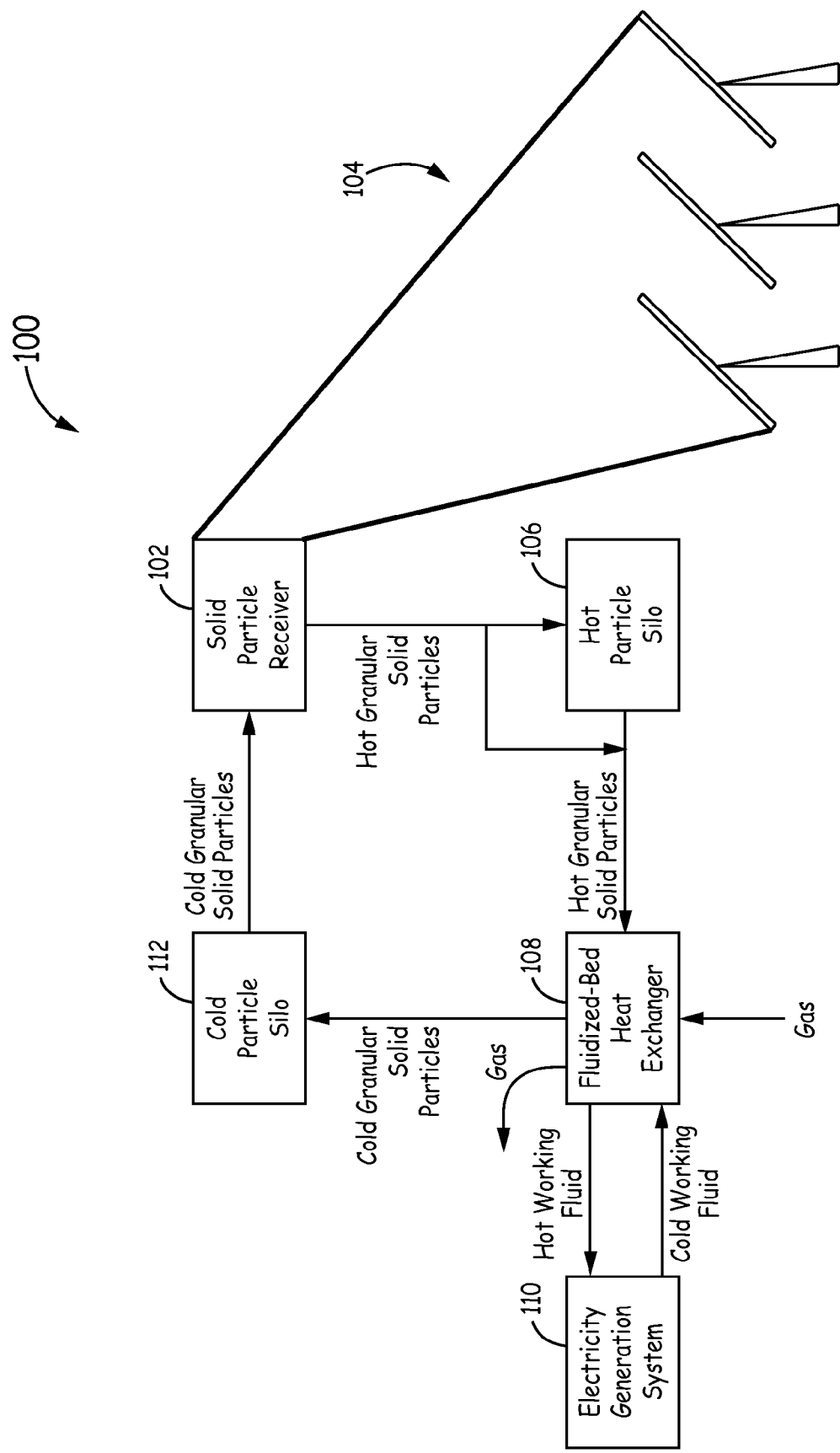
FIG. 1 is a block diagram of an example concentrating solar power (CSP) system using solid particles has a heat transfer material and for thermal storage.

FIG. 1 is a block diagram of an example concentrating solar power (CSP) system 100 using solid particles has a heat transfer material and for thermal storage. The CSP system 100 includes a solid particle receiver 102 configured to heat granular solid particles flowing therethrough using energy from solar flux incident thereon. A reflector field 104 is configured to reflect solar flux onto the solid particle receiver 102.

When sufficient solar flux is available to the receiver 102, the CSP system 100 is configured to drop granular solid particles through the solid particle receiver 102. As the granular solid particles flow through the solid particle receiver 102, the granular solid particles are heated based on the energy from the solar flux incident on the receiver 102. After being heated by the receiver 102, the hot granular solid particles can be directed to one or more hot particle silos 106. The hot particle silo(s) 106 are configured to store the hot particles, such that the hot particles retain the heat therein.

Hot particles directly from the receiver 102 and/or from the hot particle silo 106 can be provided to a fluidized-bed heat exchanger 108. In an example, the dispensing of the hot particles from the hot particle silo 106 based on the thermal load. Within the fluidized-bed heat exchanger 108, the granular solid particles can be fluidized by an appropriate gas to create a gas-solid fluid. The gas-solid fluid can be caused to flow (e.g., circulate) through the heat exchanger 108 in order to transfer heat from the solid particles in the gas-solid fluid to a separate working fluid. Fluidizing the solid particles can aid in transferring heat from the solid particles as they are suspended in the gas-solid fluid, and can enable easier movement of the gas-solid fluid through the heat exchanger 108. Accordingly, the solid particles are cooled as they pass through the heat exchanger 108, and a working fluid is heated as it passes through the heat exchanger 108. The hot working fluid exiting from the heat exchanger 108 is directed to an electricity generation system 110 for generation of electricity from the hot working fluid. Generating electricity from the hot working fluid cools the hot working fluid. After the desired electricity has been generated from the working fluid by the electricity generation system 110, the now cold working fluid can be directed back to the heat exchanger 108 to be reheated by hot solid particles therein.

At some point within or after the heat exchanger 108, the solid particles can be extracted from the gas-solid fluid resulting in granular solid particles separate from the gas used to fluidize the solid particles. The separated gas can be discarded or can be recycled by directing the gas back to the heat exchanger 108 to fluidize solid particles therein.

Once the desired heat has been extracted from the solid particles by the heat exchanger 108 and the solid particles have been extracted from the gas-solid fluid, the cold solid particles can be directed to one or more cold particle silos 112. The cold particle silo(s) 112 are configured to store the cold particles, such that the cold particles are available to be dropped through the solid particle receiver 102 and be heated therein. The cold particles dropped through the solid particle receiver 102 can be obtained directly from the fluidized-bed heat exchanger 108 and/or from the cold particle silo 112.

In this way, the CSP system 100 uses a loop where solid particles are heated and cooled to transfer energy from solar flux into a working fluid. Moreover, the CSP system 100 uses two-phase gas-solid heat transfer material to provide efficient heat transfer. Notably, granular solid particles (the first phase) are heated in the solid particle receiver 102, and the resulting hot solid particles are fluidized in the fluidized-bed heat exchanger 108 to form a gas-solid fluid (the second phase). As a gas-solid fluid heat can be efficiently extracted from the solid particles in the gas-solid fluid. After extracting heat from the solid particles in the gas-solid fluid, the solid particles are extracted from the gas-solid fluid resulting in granular solid particles, which can then be dropped through the solid particle receiver 102 to be heated once again. Moreover, the granular solid particles, hot and cold respectively, can be efficiently stored to provide thermal energy storage in the case of hot particles or for future heating in the receiver 102 in the case of cold particles.

Any appropriate gas, for example air, can be used to fluidize the solid particles in the fluidized-bed heat exchanger 108. Additionally, the solid particles can be composed of any appropriate material including but not limited to ash, sand, metal-oxide, or other stable solid particle having good fluidization ability. Solid particles for the CSP system 100 can be selected based on overall thermal system performance, stability, and energy density. The particle properties, such as composition, softening temperature, density, heat capacity, particle size, size distribution, and void fraction can also be used to select appropriate solid particles. Regarding the particle size, a smaller particle usually has a larger heat-transfer coefficient. The heat exchanger 108 and separator performance characteristics can also be considered when selecting the particle size and density. Example granular solid particles for use in the CSP system 100 include silica sand, quartz sand, aluminum oxide, ash, silicon carbide, graphite pebble, or any combination of these. Some ash that contains minerals such as sodium or potassium may cause corrosion to some steel or ceramic components. Accordingly, in some examples, ash is selected that does not include such corrosive minerals. Such ash can be obtained by using a sieve to separate the ash from the corrosive minerals. Any appropriate electrical generation system 110 can be used including but not limited to a sub/super critical steam cycle, S—$CO_2$ Brayton cycle, air-Brayton cycle, and gas turbine combined cycle. Additionally, the working fluid can be any appropriate fluid including, but not limited to water, including liquid water and steam, as well as air, S—$CO_2$, or chemical energy carriers.

The fluidized-bed heat exchanger 108 can include any appropriate heat exchanger that is configured to fluidized solid particles in order to extract heat therefrom. As used herein fluidize solid particles refers to the process of injecting gas about granular solid particles such that the granular solid particles are converted from a static solid-like state to a dynamic fluid-like state.

Thermal energy storage in the disclosed embodiments is based upon storage of heated granular solid particles in hot particle silos. The storage media is the granular solid particles described in detail above. In some examples, to decrease the storage size and system footprint, phase change materials (PCM) could be used for high heat capacity storage thereby increasing the TES energy density. A TES system with PCM storage can have high thermal capacity through the combination of sensible heat and latent heat, and a large operational temperature range.

Figure 2:
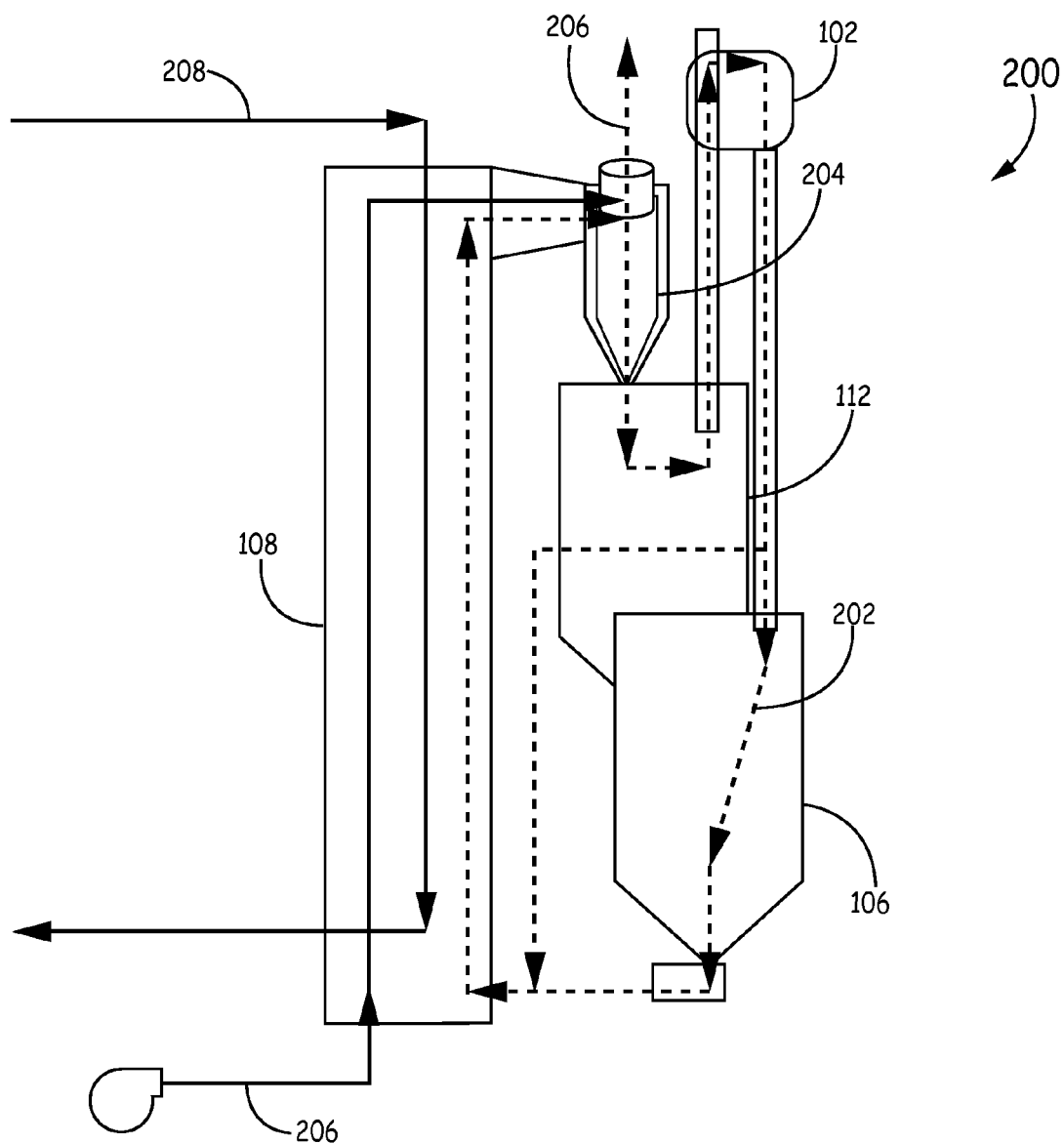
FIG. 2 is an example CSP system that heats solid particles with a solid particle receiver 102, and fluidizes the granular solid particles for heat transfer to a working fluid.

FIG. 2 is an example CSP system 200 that heats solid particles with a solid particle receiver 102, and fluidizes the granular solid particles for heat transfer to a working fluid. The CSP system 200 includes a solid particle receiver 102, a hot particle silo 106, a fluidized-bed heat exchanger 108, and a cold particle silo 112 as described with respect to FIG. 1. As shown, the solid particle receiver 102 can be disposed a substantial distance above the ground. This enables the reflector field 104 to reflect solar flux directly onto the receiver 102. The hot particle silo 106 can be disposed lower in height than the receiver 102, such that solid particles traveling through the receiver can use gravity flow to travel from the receiver 102 to the hot particle silo 106. This enables the solid particles to be dropped into a top portion of the receiver 102 use gravity flow to travel through the receiver 102 and continue to use gravity flow to travel from the receiver 102 into the hot particle silo 106. A portion or all of the hot particles may bypass the hot particle silo 106 and be sent to the heat exchanger 108 directly for immediate power generation. The dotted line 202 in FIG. 2 represents the cycle of the solid particles through the CSP system 200. By using gravity flow, the granular solid particles travel from the receiver 102 and drop into a top portion of the hot particle silo 106. As discussed above, the (hot) solid particles can be stored in the hot particle silo 106 for a desired length of time. Hot particles can exit the hot particle silo 106 at a bottom portion with the aid of gravity flow and be passed over to the heat exchanger 108 using any appropriate means, such as a conveyor belt or pneumatic transport. Within the heat exchanger 108, the granular solid particles are suspended (fluidized) in a gas flow 206 to produce a gas-solid fluid. The gas-solid fluid can pass through the heat exchanger 108 and heat can be transferred from the solid particles in the gas-solid fluid to a working fluid 208. In the example shown in FIG. 2, the solid particles enter at a bottom portion of the heat exchanger 108 and are forced upward through the heat exchanger 108 as the gas-solid fluid.

After extracting heat from the solid particles in the gas-solid fluid with the heat exchanger 108, the solid particles can be extracted from the gas-solid fluid. In the example shown in FIG. 2, the solid particles are extracted from the gas-solid fluid using a separator 204. In this example, the separator 204 is a cyclone separator; however, other separators to separate solids from gas-solid fluids can be used. The gas-solid fluid exits a top portion of the heat exchanger 108 and is passed to the cyclone separator 204. Advantageously, the pressure applied by the gas 206 used to fluidize the solid particles is also used to transport the solid particles upward pneumatically. The pressure from the fluidization gas 206 can force the gas-solid fluid through the heat exchanger 108 and into the cyclone separator 204. The cyclone separator 204 uses cyclonic separation to extract the solid particles from the gas-solid fluid. In cyclonic separation, the solid particles drop out a bottom of the cyclone separator 204 and the gas 206 can exit from a top of the cyclone separator 204. In the example shown in FIG. 2, the cold silo 112 is disposed lower in height than cyclone separator 204, such that the solid particles can use gravity flow to travel from the cyclone separator 204 and drop into a top portion of the cold particle silo 112.

The receiver 102 can be disposed generally above the cold particle silo 112 and the solid particles can be extracted from a top portion of the cold particle silo 112 and mechanically lifted to the receiver 102. In a particular example, the cold particle silo 112 can be disposed underneath the receiver 102 such that solid particles can be scooped from a top of the pile in the cold particle silo using a bucket conveyor (e.g., a peel grab) and dropped into the receiver 102 by the bucket conveyor. Accordingly, in the CSP system 200, the solid particles complete a cycle by being lifted using the fluidization gas and falling according to gravity.

Figure 3A:
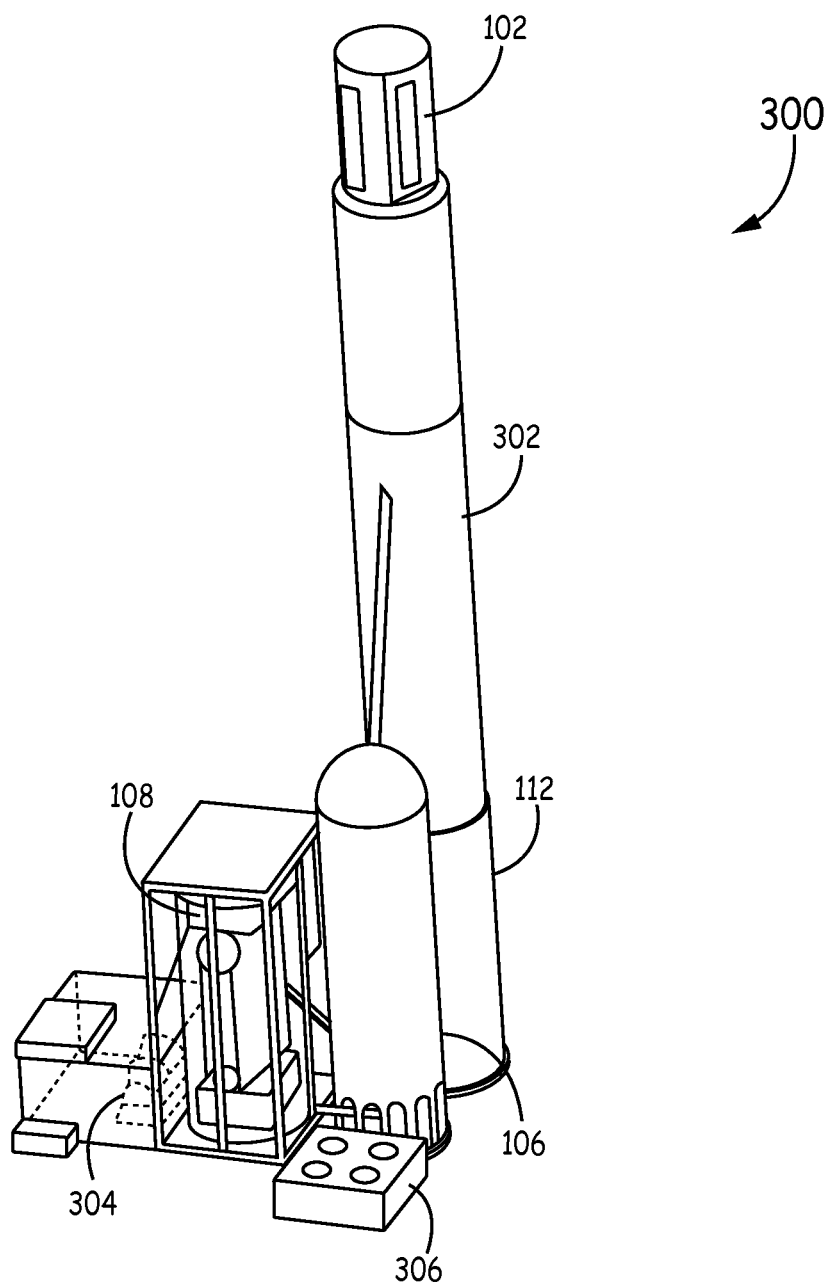
FIGS. 3A and 3B are perspective views of an example CSP system.
Figure 3B:
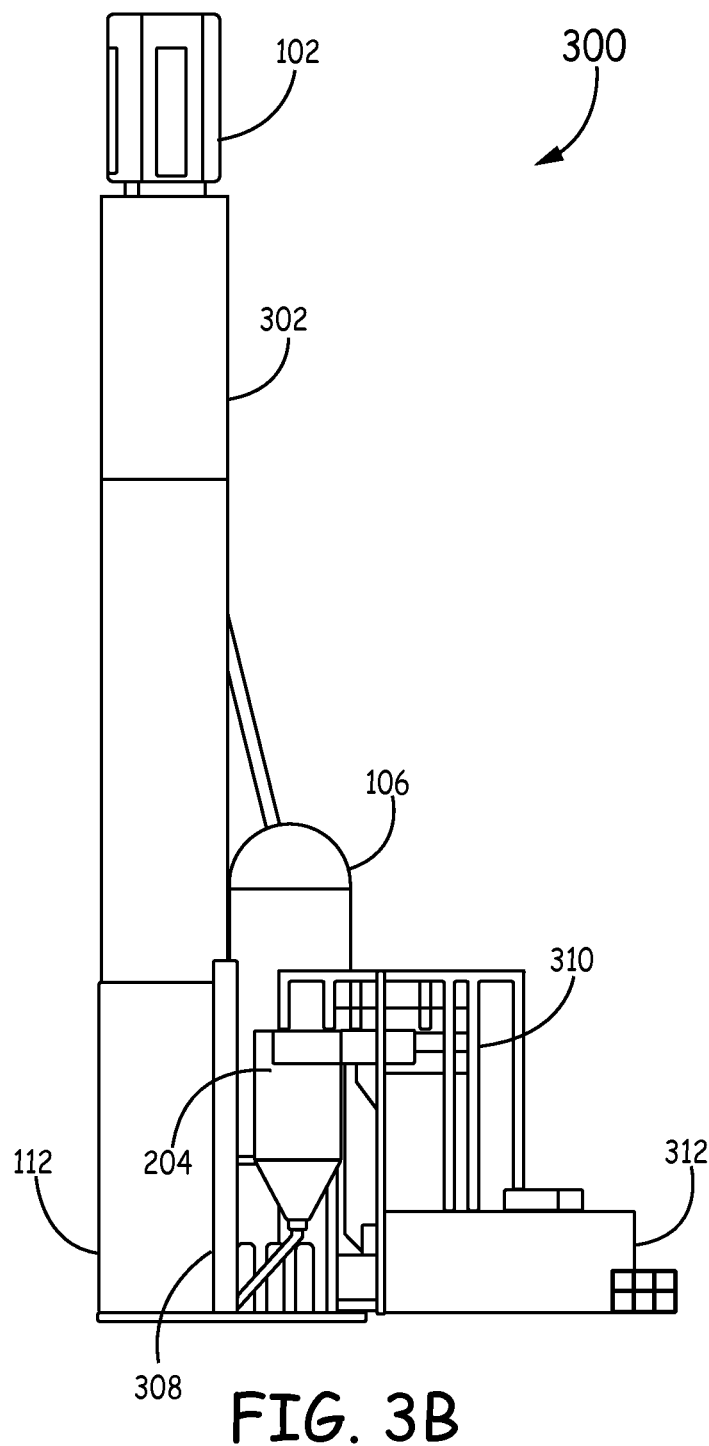

FIGS. 3A and 3B are perspective views of an example CSP system 300. Similar to system 200, the solid particle receiver 102 of system 300 is disposed overtop of the cold particle silo 112. To position the receiver 102 higher to receive the solar flux from the reflector field 104, a receiver tower 302 is constructed on top of the cold particle silo 112. The receiver tower 302 can comprise a support structure having one or more passages therein to enable the granular solid particles to be lifted up to the receiver 102 and to drop down from the receiver 102 into the hot particle silo 106. The hot particle silo 106 can be disposed adjacent the receiver tower 302, such that the solid particles can fall using gravity flow from the receiver 102 into the hot particle silo 106. In the example shown in FIGS. 3A and 3B, the cyclone separator 204 is disposed adjacent the cold particle silo 112, and a mechanical lift 308 (e.g., a bucket conveyor) is used to lift the solid particles falling out of the cyclone separator 204 up to drop into a top portion of the cold particle silo 112. FIG. 3A also illustrates the heat exchanger 108 for transferring heat from the solid particles to a working fluid, a power turbine 304 for generating power from the heat in the working fluid, and an air cooler 306. FIG. 3B also illustrates a control center 310 and a power distribution system 312 for the CSP system 300.

Figure 4:
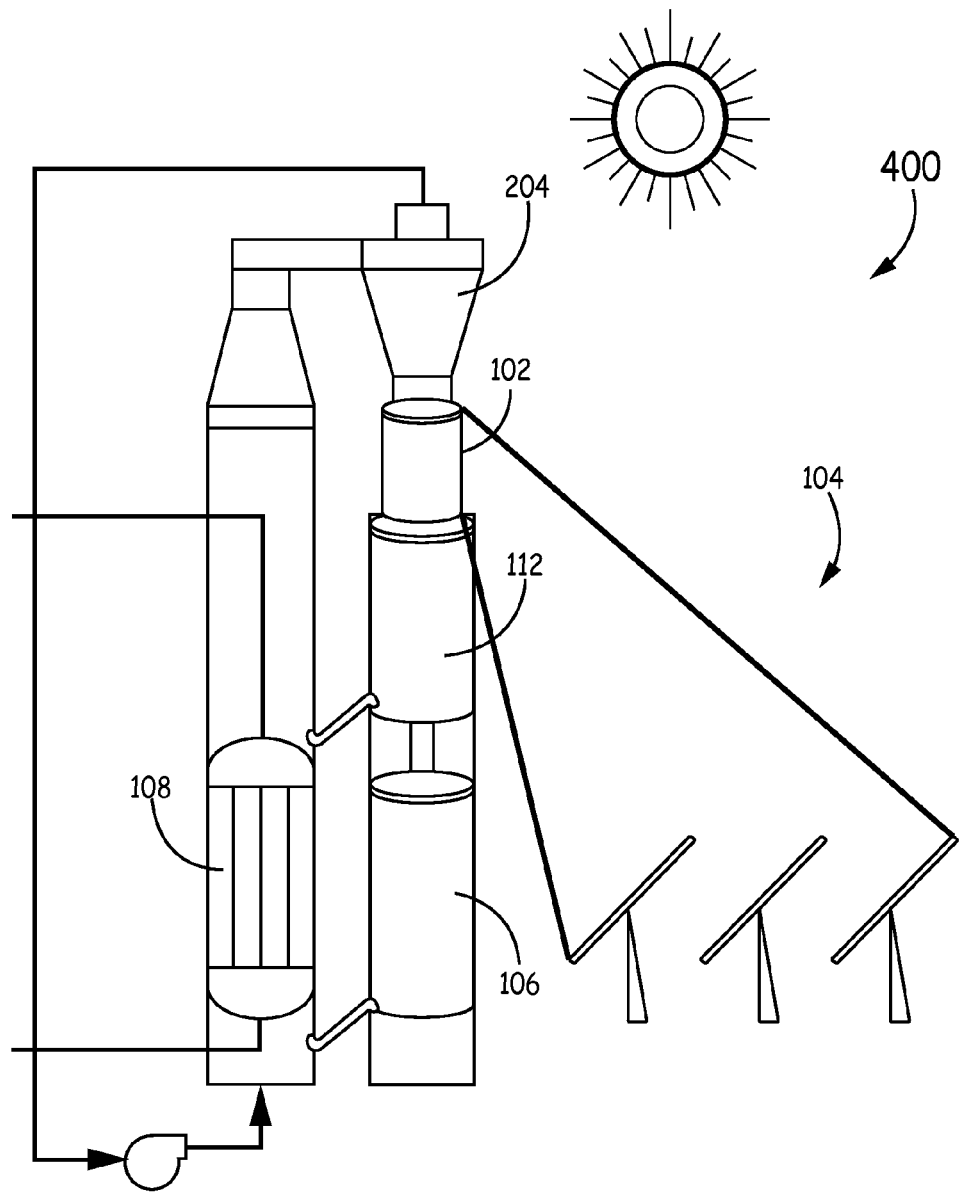
FIG. 4 is a block diagram of another example CSP system.

FIG. 4 is a block diagram of another example CSP system 400. In system 400, both the solid particle receiver 102 and the cold particle silo 112 are disposed lower in height than the cyclone separator 204. This enables, the solid particles separated by the cyclone separator 204 to fall using gravity flow from the cyclone separator 204 either through the receiver 102 or into the cold particle silo 112. With the receiver 102 lower in height than the cyclone separator 204, when sufficient solar flux is available, the solid particles separated by the cyclone separator 204 can use gravity flow to travel from the separator 204 to and through the receiver 102 and into the hot particle silo 106 or bypass the hot particle silo 106 and be directed to the heat exchanger 106. Using this path, the solid particles by-pass the cold particle silo 112. Instead of dropping from the separator 204 into the receiver 102, the solid particles can drop from the separator 204 into the cold particle silo 112 for storage, which can be used, for example, when there is less solar flux available. The solid particles from the cold particle silo 112 can be lifted up to drop into the solid particle receiver 102 using a mechanical lift (e.g., a bucket conveyor) as desired.

Figure 5:
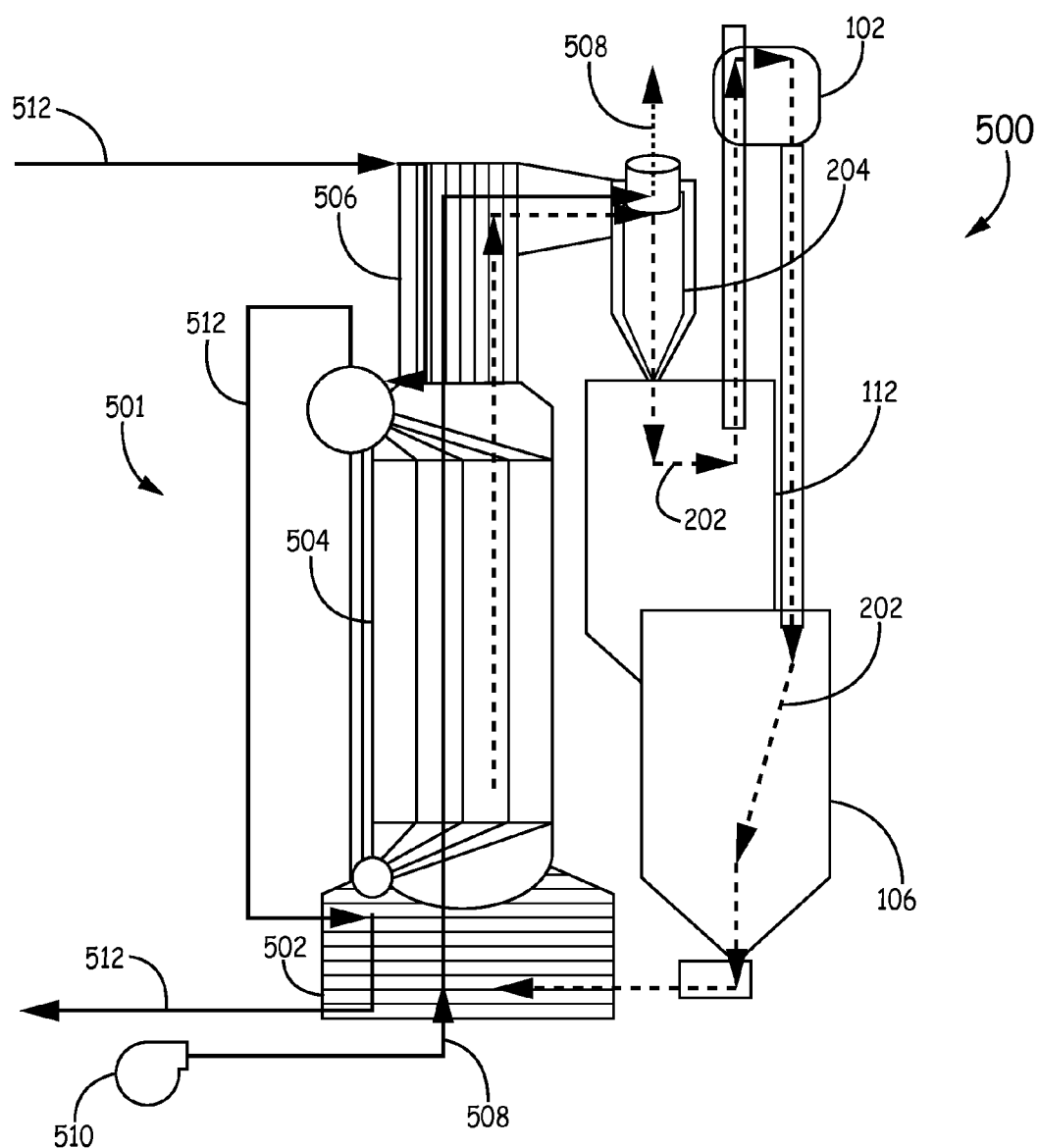
FIG. 5 illustrates a block diagram of an example CSP system showing an example fluidized-bed heat exchanger for use with any of the CSP systems of FIGS. 1-4.

FIG. 5 illustrates a block diagram of an example CSP system 500 showing an example fluidized-bed heat exchanger 501 for use with any of the CSP systems 100-400. The fluidized-bed heat exchanger 501 is a stack-up type boiler having three stages 502, 504, 506 stacked vertically on top of one another. The first stage is a stationary bed super heater/reheater 502 and is disposed on underneath the second and third stages. The stationary bed super heater/reheater 502 receives granular solid particles from the hot particle silo 106. The granular solid particles forced through the stationary bed super heater/reheater 502 by a fluidization gas 508 and a compressor 510. The granular solid particles move slowly across the heat transfer surfaces of the stationary bed super heater/reheater 502. The stationary bed super heater/reheater 502 has a large cross-section and low particle speed to reduce particle erosion on high temperature piping. The stationary bed super heater/reheater 502 is configured to direct the flow of the partially fluidized solid particles through the stationary bed super heater/reheater 502 transferring heat from the solid particles to the working fluid 512. The stationary bed super heater/reheater 502 is configured to direct the flow of the partially fluidized solid particles to the turbulent bed evaporator 504 which is the second stage of the heat exchanger 501. The turbulent bed evaporator 504 is configured to fully fluidize the solid particles to form a gas-solid fluid using the fluidization gas 508. The turbulent bed evaporator 504 is configured to direct the gas-solid fluid upward from a bottom portion of the turbulent bed evaporator 504 through the turbulent bed evaporator 504 and to a top portion of the turbulent bed evaporator 504. As the gas-solid fluid flows upward, heat is transferred from the solid particles to the working fluid 512. The gas-solid fluid is directed out of the top portion of the turbulent bed evaporator 504, and to the fast bed preheater 506 which is disposed above the turbulent bed evaporator 504. The fast bed preheater 506 is the third stage of the heat exchanger 501. The gas-solid fluid is received at a bottom portion of the fast bed preheater 506 and is directed upward through the fast bed preheater 506 where heat is again transferred from the solid particles to the working fluid. The gas-solid fluid is directed to exit the fast bed preheater 506 at a top portion thereof and is directed to the separator 204 to separate the solid particles from the gas in the gas-solid fluid. The fluidization gas from the separator 204 can be recirculated to the compressor 510 for re-use. Advantageously, the stack-up heat exchanger 501 shown in FIG. 5 transfers heat from the solid particles to the working fluid while also moving the solid particles up in height, such that the solid particles can later use gravity flow to move through various parts of the system.

In the example system 500, the working fluid flows counter to the direction of the gas-solid fluid through the heat exchanger 501. That is, the cold working fluid enters the top portion of the fast bed preheater 506 and flows downward through the three stages of the heat exchanger 501 and exits a bottom portion of the stationary bed super heater/reheater 502 as hot working fluid. In the example system 500, the cold working fluid is water and exits the heat exchanger 501 as steam which is the hot working fluid.

Figure 6:
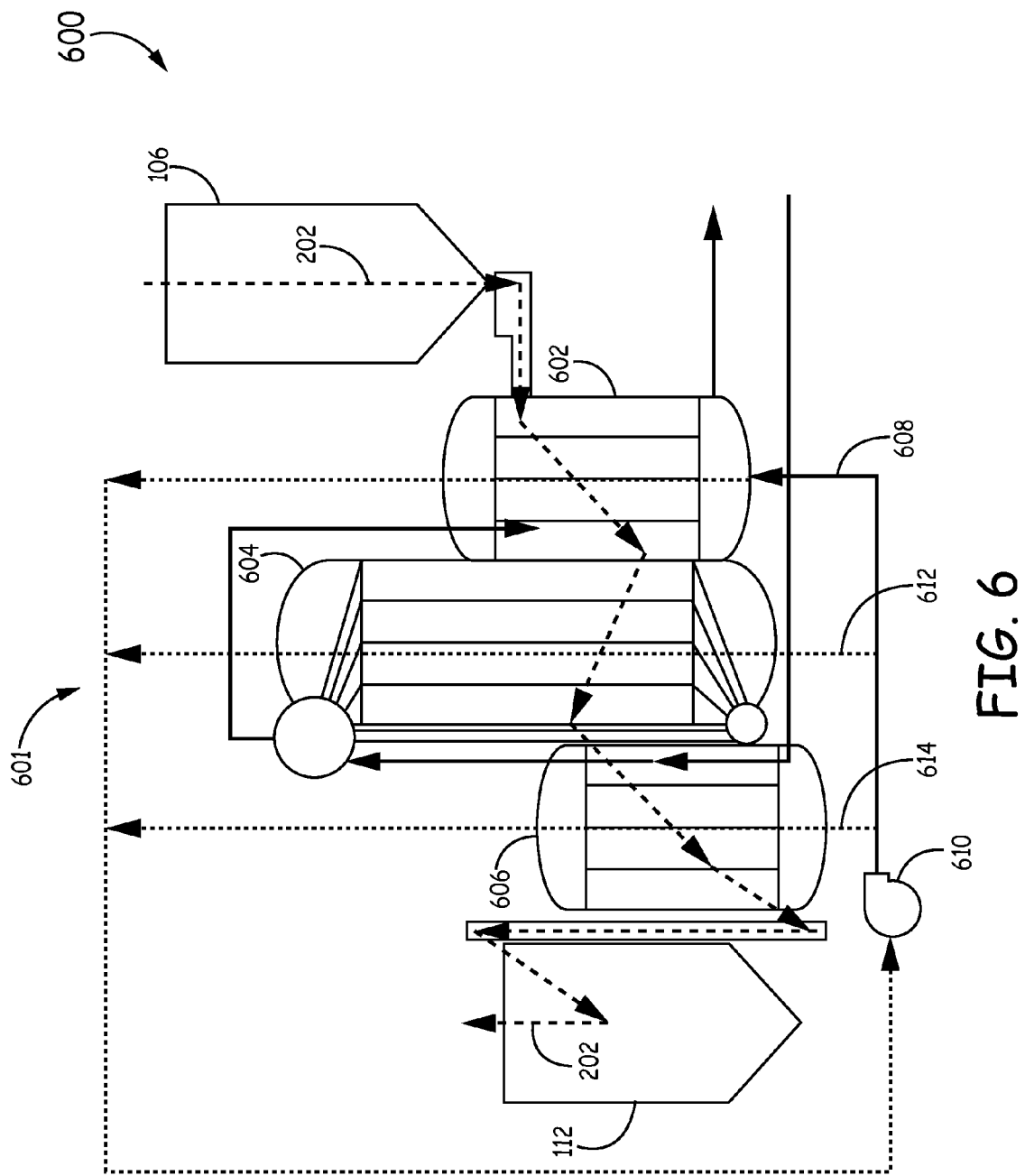
FIG. 6 illustrates a block diagram of an example CSP system showing another example fluidized-bed heat exchanger for use with any of the CSP systems of FIGS. 1-4.

FIG. 6 illustrates a block diagram of an example CSP system 600 showing another example fluidized-bed heat exchanger 601 for use with any of the CSP systems 100-400. The fluidized-bed heat exchanger 601 is a cascading system having three stages 602, 604, 606 horizontally adjacent to one another. The first stage is a moving bed super heater/reheater 602 and is configured to receive granular solid particles from the hot particle silo 106 at a first side of the moving bed super heater/reheater 602. The granular solid particles are partially fluidized by a first fluidization gas 608 that is forced into the moving bed super heater/reheater 602 using a compressor 610. The moving bed super heater/reheater 602 is configured to direct the flow of the partially fluidized solid particles from one side, through the moving bed super heater/reheater 602, and to the other side of the moving bed super heater/reheater 602. The partially fluidized solid particles exit the moving bed super heater/reheater 602 and enter a side of a turbulent bed evaporator 604 which is the second stage of the heat exchanger 601. The turbulent bed evaporator 604 is configured to fully fluidize the solid particles to form a gas-solid fluid using a second fluidization gas flow 612. The turbulent bed evaporator 604 is configured to direct the gas-solid fluid through the turbulent bed evaporator 604 to exit on the other side thereof. In an example, a side blowing gas-distributor can be used to move the solid particles from the inlet side of the turbulent bed evaporator 604 to the outlet side for effective use of the heat of the solid particles.

The gas-solid fluid form the turbulent bed evaporator 604 progresses to the bubbling bed preheater 606, which is the third stage of the heat exchanger 601. The bubbling bed preheater 606 is configured to direct the gas-solid fluid from one side to the other using a third fluidization gas 614. The fluidization gases from the respective stages of the heat exchanger 601 can be recirculated to the compressor 610 for re-use. As the gas-solid fluid progresses through the bubbling bed preheater 606, the bubbling bed preheater 606 is configured to gradually reduce the force of the fluidization gas, such that the solid particles gradually separate from the gas and settle into a bottom portion of the bubbling bed preheater 606, the granular solid particles are then transported from the bubbling bed preheater 606 to the cold particle silo 112. Similar to system 500, in the example system 600, the working fluid flows counter to the direction of the solid particles (and the gas-solid fluid) through the heat exchanger 601. That is, the cold working fluid enters the top portion of the bubbling bed preheater 606 and flows across through the three stages of the heat exchanger 601 and exits the moving bed super heater/reheater 602. In an example, the cold working fluid is water which exits the heat exchanger 601 as steam which is the hot working fluid. Similar embodiments can be applied with some rearrangement to a single-phase S—CO2 power system, which is further discussed below.

Figure 7:
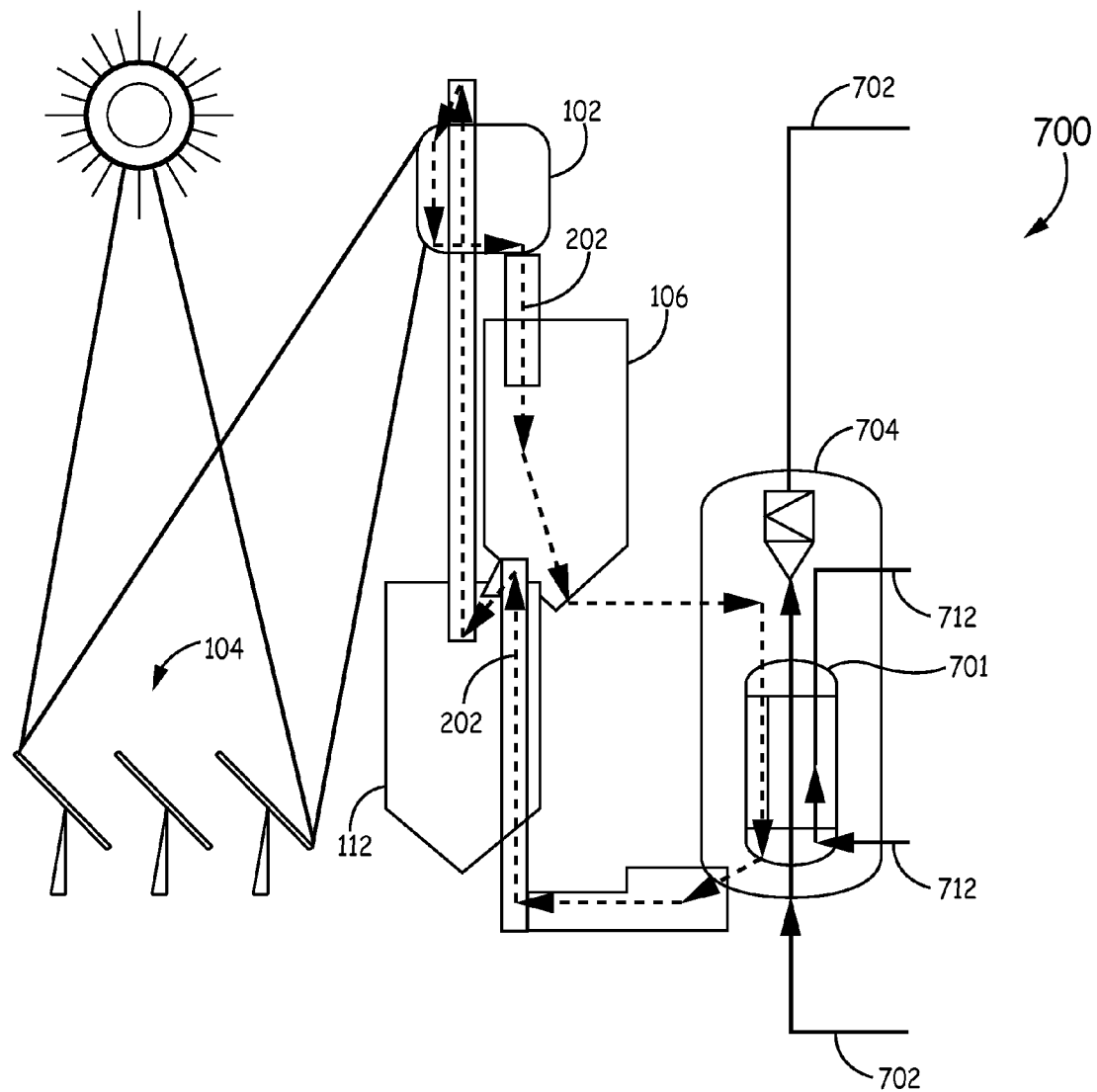
FIG. 7 is a block diagram of an example CSP system showing yet another example fluidized-bed heat exchanger for use with any of the CSP systems of FIGS. 1-4.

FIG. 7 is a block diagram of an example CSP system 700 showing yet another example fluidized-bed heat exchanger 701 for use with any of the CSP systems 100-400. The fluidized-bed heat exchanger 701 is a pressurized fluidized-bed heat exchanger where the heat exchanger 701 is inside of a pressurized chamber 704. In the heat exchanger 701, the granular solid particles are fluidized by a fluidization gas 702 that is directed upward through the heat exchanger 701. The solid particles meanwhile enter near a top portion of the heat exchanger 701 and while being fluidized by the fluidization gas 702 to form a gas-solid fluid, gradually settle out from the gas-solid fluid to the bottom of the heat exchanger 701. The solid particles are then transported to the cold particle silo 112. While the solid particles are fluidized as a gas-solid fluid, the heat exchanger 701 is configured to transfer heat from the solid particles to the working fluid 712 flowing through the heat exchanger 701. In an example, the fluidization gas 702 from the heat exchanger 701 can flow through a gas turbine for power generation and then be recirculated for re-use after cooling and recompression in a closed-loop cycle. In an alternative example, the fluidization gas 702 is in an open-loop cycle where the fluidization gas from the heat exchanger 701 is exhausted from the system, possibly after being passed through a gas turbine, and fresh air is taken into the compressor. In an example, the pressure chamber 704 for the heat exchanger 701 can be constructed according to the silo design described below with respect to FIG. 14.

Figure 8:
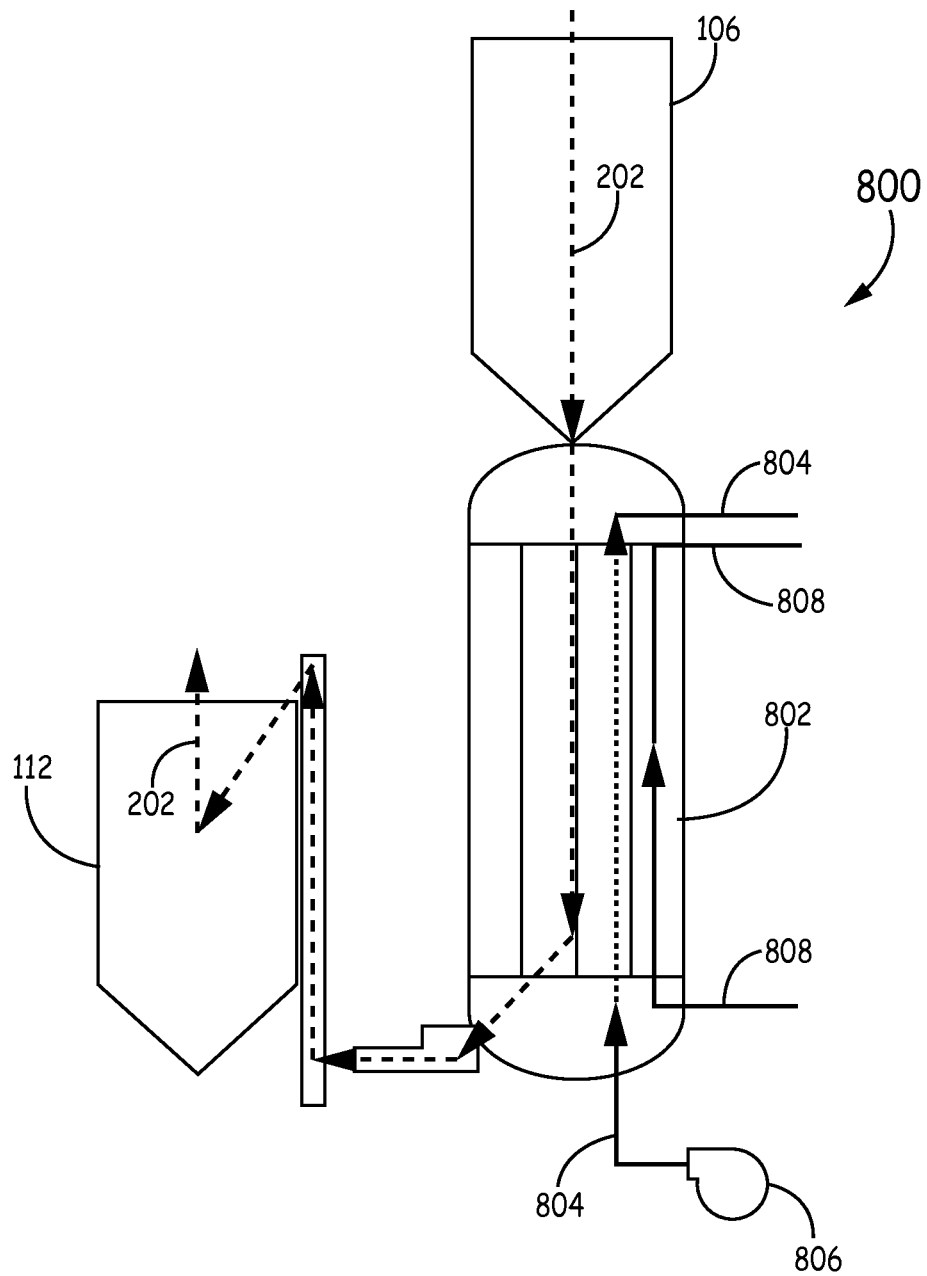
FIG. 8 is a block diagram of an example CSP system having a heat exchanger that uses gravity flow to move granular solid particles therethrough.

FIG. 8 is a block diagram of an example CSP system 800 having a heat exchanger 802 that uses gravity flow to move granular solid particles 202 therethrough. In the heat exchanger 802, the solid particles 202 are not fluidized; instead, the solid particles 202 slowly pass through the heat exchanger 802 flowing downward while in contact with heat transfer surfaces. The heat transfer surfaces are configured to enable the transfer of heat from the solid particles 202 to a working fluid 808 flowing through the heat exchanger 802.

In operation, granular solid particles 202 from a hot particle silo 106 can be dropped into a top portion of the heat exchanger 802. The granular solid particles 202 can slowly move through the heat exchanger 802 using gravity flow. While moving through the heat exchanger 802, the solid particles 202 contact the heat transfer surfaces to transfer heat to a working fluid 808 flowing through the heat exchanger 802. The granular solid particles 202 can then drop out a bottom portion of the heat exchanger 802 using gravity flow. In some examples, a gas 804, compressed by a compressor 806, can be used to agitate the granular solid particles 202 to help the solid particles 202 flow through the heat exchanger 802. The gas 804 can enter near a bottom of the heat exchanger 802 flow through the granular particles 202 to agitate the solid particles 202, and the gas 804 can exit near a top of the heat exchanger 802. In other examples, a moving-bed may be used to aid the flow of the solid particles 202 through the heat exchanger 802. The solid particles 202 exiting the bottom portion of the heat exchanger 802 can be transferred to a cold particle silo 112.

Figure 9:
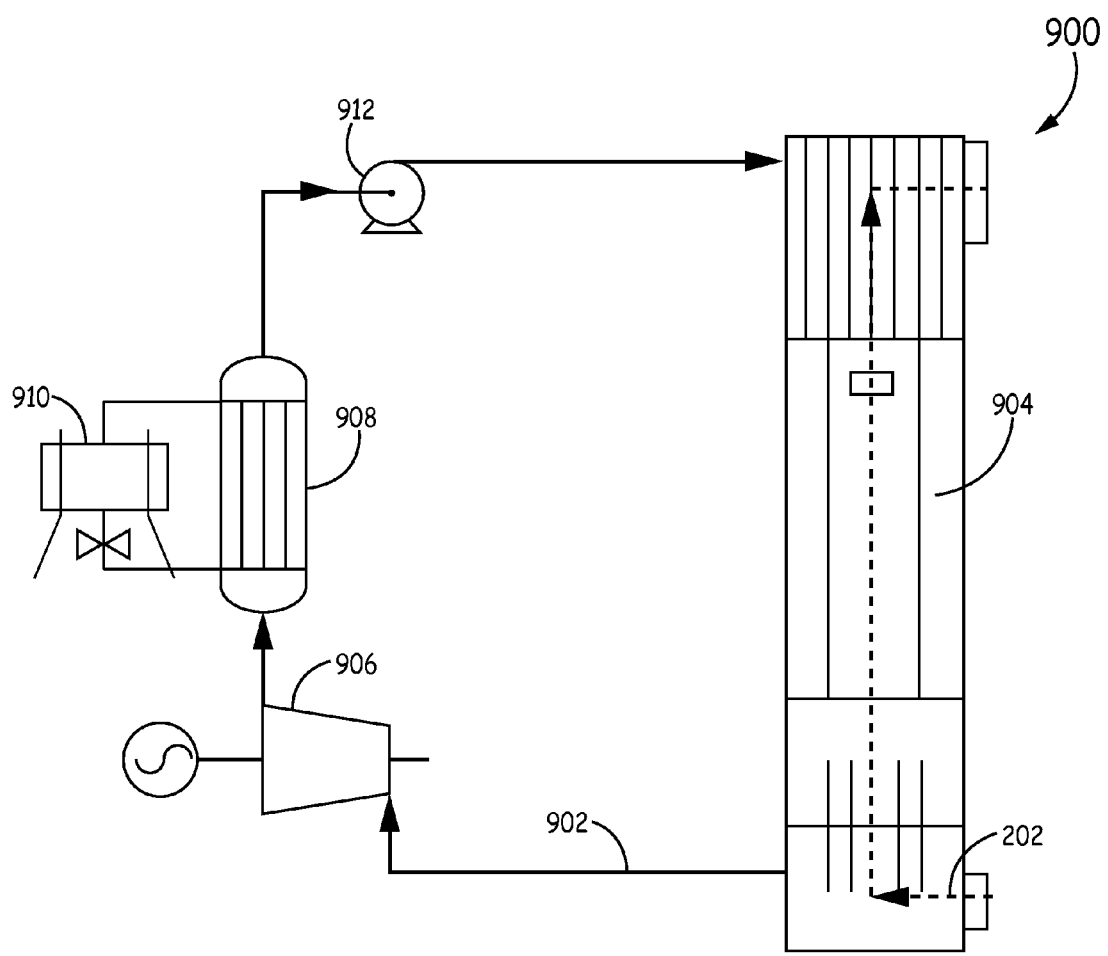
FIG. 9 is a block diagram of an example power generation system for use with any of the CSP systems of FIGS. 1-8.

FIG. 9 is a block diagram of an example power generation system 900 for use with any of the CSP systems 100-800 described above. The power generation system 900 receives hot working fluid 902 from a heat exchanger 904. The hot working fluid 902 is directed to a turbine 906 to generate AC electricity from the hot working fluid 902. In an example, the hot working fluid 902 is steam and the turbine 906 is a steam turbine. The working fluid can exit the turbine 906 and be provided to a condenser 908 and a cooler 910 which can condense the steam working fluid into liquid water. The liquid water working fluid can be directed by a pump 912 back into the heat exchanger 902 to be re-heated, thus completing the cycle. In the example shown in FIG. 9, the power generation system 900 is used with a stack-up fluidized-bed heat exchanger 904 as described with respect to FIG. 5; however, other heat exchangers can also be used.

Figure 10:
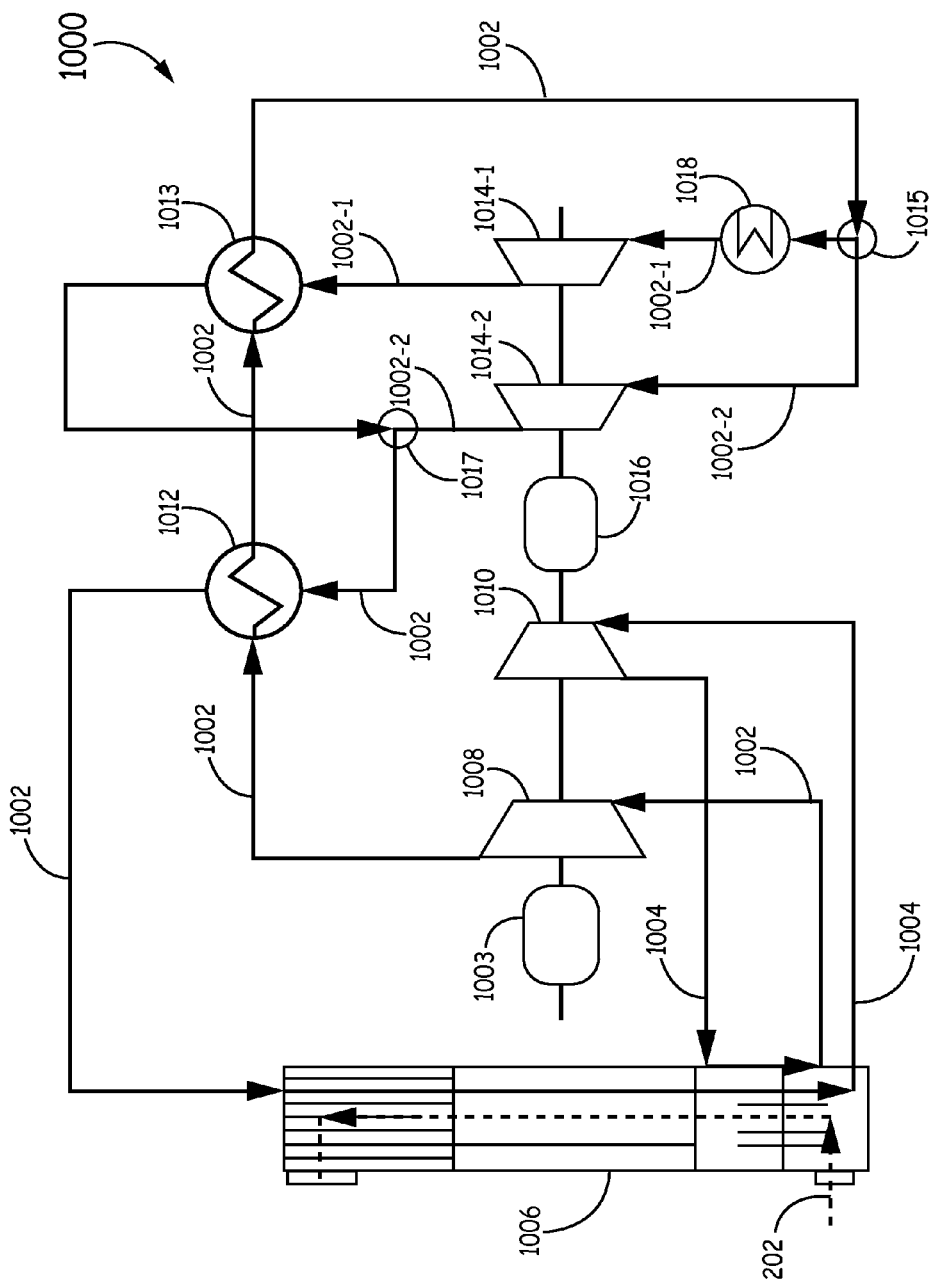
FIG. 10 is a block diagram of an example of another power generation system for use with any of the CSP systems of FIGS. 1-8.

FIG. 10 is a block diagram of an example of another power generation system 1000 for use with any of the CSP systems 100-800 described above. The power generation system 1000 is also known as an S—CO2 Brayton cycle. The power generation system 1000 receives two flows of hot working fluid 1002, 1004 from the heat exchanger 1006. A first working fluid flow 1002 is directed to a first turbine 1008 to turn a generator 1003 to generate AC electricity. The second working fluid flow 1004 is directed to a second turbine 1010. In this example the first and second hot working fluids are S—CO2. The second turbine 1010 is used to run the compressors for compressing the steam of the first hot working fluid into high pressure S—CO2. The second working fluid flow 1004 is directed back into the heat exchanger 1006 after going through the second turbine 1010. In the example shown in FIG. 10, the second working fluid flow 1004 is directed back into the super heater/reheater stage of the heat exchanger 1006.

The first working fluid flow 1002 is directed from the first turbine 1008 to two heat exchangers 1012, 1013 which exchange heat with a later stage of the first working fluid flow 1002. After the heat exchangers 1012, 1013, the first working fluid flow 1002 is split into two flows at 1015, to form a first split flow 1002-1 and a second split flow 1002-2. The first split flow 1002-1 is directed to a first of two compressors 1014-1 and the second split flow 1002-2 is directed to a second of two compressors 1014-2. The two compressors 1014-1, 1014-2 are configured to operate the second turbine 1010. A motor/brake 1016 can be included for further control of the compressors 1014-1, 1014-2. A precooler 1018 can be used to further cool the working fluid in the first split flow 1002-1. After being compressed into high pressure S—CO2 by a first of the two compressors 1014-1, the first split flow 1002-1 is sent to the heat exchanger 1013. The second split flow 1002-2 is compressed by the second of the two compressors 1014-2. After being compressed by the second of the two compressors 1014-2, the second split flow 1002-2 is re-combined at 1017 with the first split flow 1002-1 and the (combined) first working fluid flow 1002 is directed through the heat exchanger 1012. After the heat exchanger 1012, the first working fluid flow 1002 is directed back to the heat exchanger 1006. In the example shown in FIG. 10, the power generation system 1000 is used with a stack-up fluidized-bed heat exchanger 1006 as described with respect to FIG. 5; however, other heat exchangers can also be used.

Figure 11:
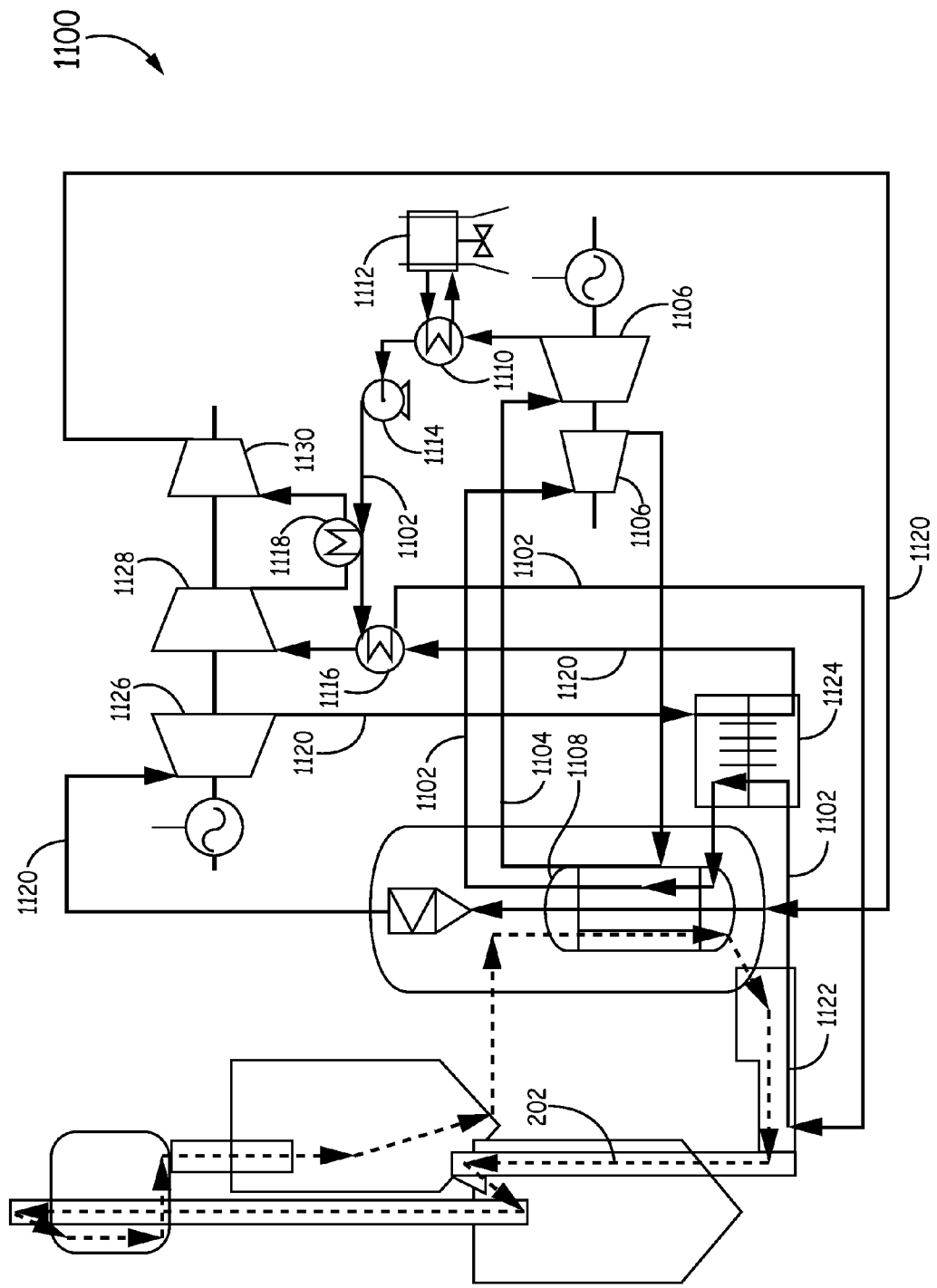
FIG. 11 is a block diagram of an example of yet another power generation system for use with any of the CPS systems of FIGS. 1-8.

FIG. 11 is a block diagram of an example of yet another power generation system 1100 for use with any of the CSP systems 100-800 described above. The power generation system 1100 is also known as a gas turbine combined cycle. The power generation system 1100 receives two flows of hot working fluid flows 1102, 1104. Each of the two hot working fluid flows 1102, 1104 are provided to respective turbines 1106 to generate AC electricity therefrom. The second working fluid flow 1104 is directed from its respective turbine 1106 back to the heat exchanger 1108 for reheating. In this example, the first and second hot working fluids 1102, 1104 are steam. The first working fluid flow 1102 is directed to a condenser 1110 and air cooler 1112 to condense the steam to liquid water. The liquid water working fluid 1102 is directed to a pump 1114 which forces the working fluid 1102 through two precoolers 1116, 1118 configured to exchange heat with the fluidization gas 1120 used to fluidize the solid particles in the heat exchanger 1108. The working fluid 1102 is then directed to a solid particle cooler 1122 which cools the solid particles after the solid particles exit the heat exchanger 1108. The working fluid 1102 is then directed to a heat recovery heat exchanger 1124 which again exchanges heat with the fluidization gas 1120. From the heat recovery heat exchanger 1124, the working fluid 1102 is directed back to the heat exchanger 1108 completing the cycle. In an example, the working fluid 1102 is steam.

The power generation system 1100 also recovers heat from the fluidization gas 1120 used to fluidize the solid particles in the heat exchanger 1108. The hot fluidization gas 1120 that exits the heat exchanger 1108 is directed to a turbine 1126 which is used to generate electricity. In an example, the turbine 1126 is close to the heat exchanger 1108 for effective power extraction. From the turbine 1126, the fluidization gas 1120 is directed to the heat recovery heat exchanger 1124 to exchange heat with and thereby preheat the working fluid 1102. The evaporation and superheating/reheating occur in the heat exchanger 1108 by extracting heat from the solid particles. From the heat recovery heat exchanger 1124, the fluidization gas 1120 is directed through the precooler 1116 and to a first of two compressors 1128, 1130. From the first compressor 1128, the fluidization gas 1120 is directed to the precooler 1118 for stage compression and to the second compressor 1130. The precooler 1118 can improve the efficiency of the compressor 1130. The compressed fluidization gas 1120 is then directed back to the heat exchanger 1108 to fluidize solid particles and complete the cycle. In the example shown in FIG. 11, the power generation system 1100 is used with a pressurized fluidized-bed heat exchanger 1108 as described with respect to FIG. 7; however, other heat exchangers can also be used. In other examples, the fluidization gas can be released after the heat recovery heat exchanger 1124 in an open loop system with compressor intake from ambient.

In an example, the cold particle temperature for any of the above systems is about 240° C. and the hot particle temperature is about 840° C.

Figure 12A:
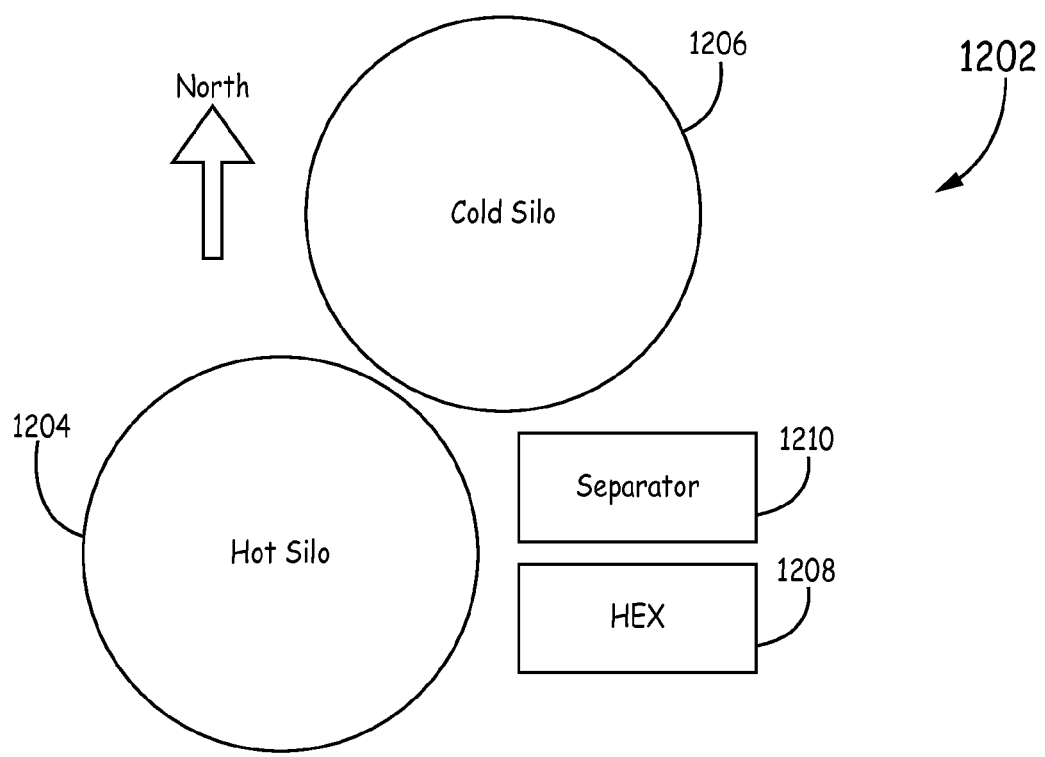
FIGS. 12A and 12B are plan views from above, showing example layouts of any of the CSP systems of FIGS. 1-11.
Figure 12B:
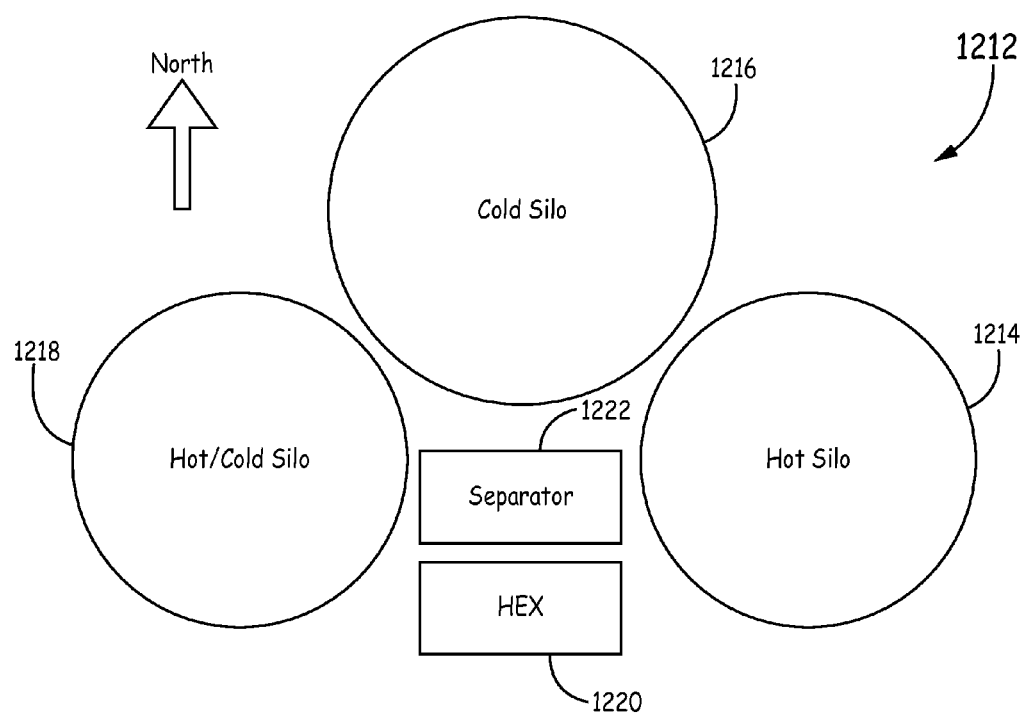

FIGS. 12A and 12B are plan views from above, showing example layouts of any of the CSP systems 100-1100 described herein. These plan views are for the northern hemisphere, however it should be understood that in the southern hemisphere, the equivalent plan views would be flipped north-to-south. FIG. 12A illustrates an example system 1202 having a single hot particle silo 1204 and a single cold particle silo 1206. The hot particle silo 1204 and the cold particle silo 1206 are disposed adjacent to the heat exchanger 1208 and the separator 1210, if present. For compactness, the heat exchanger 1208 and the separator 1210 are disposed in close proximity to one another, with the heat exchanger 1208 disposed to the south of the separator 1210. The hot particle silo 1204 is disposed generally on the west side of the heat exchanger 1208 and the separator 1210. The cold particle silo 1206 is disposed generally to the northeast of the hot particle silo 1204 and generally to the north of the heat exchanger 1208 and separator 1210. This location places the hot particle silo 1204 and the heat exchanger 1208 in the most direct sunlight. The receiver 102 can be disposed on top of the cold particle silo 1206.

FIG. 12B illustrates another example system 1212 having a single dedicated hot particle silo 1214, a single dedicated cold particle silo 1216, and a single dual hot/cold particle silo 1218. The three silos 1214, 1216, 1218 are disposed adjacent to and partially surrounding a heat exchanger 1220 and a separator 1222, if present. Similar to system 1202, the separator 1222 is disposed in proximity to the heat exchanger 1120 with the heat exchanger 1220 generally to the south of the separator 1222. The dedicated hot particle silo 1214 is disposed generally to the east of the heat exchanger 1220 and separator 1222. The dedicated cold particle silo 1216 is disposed generally to the northwest of the dedicated hot particle silo 1214 and generally to the north of the heat exchanger 1220 and separator 1222. The dual hot/cold particle silo 1218 is disposed generally to the west of the heat exchanger 1220 and separator 1222 and generally to the southwest of the dedicated cold particle silo 1216. This location places the hot particle silo 1214, the heat exchanger 1220, and the dual hot/cold particle silo 1218 in the most direct sunlight. The receiver 102 can be disposed on top of the cold particle silo 1216. The dual hot/cold particle silo 1218 can be used for overflow of either hot or cold particles from the dedicated hot and cold particle silos 1214, 1216 respectively. For example, once the dedicated cold particle silo 1216 is full, additional cold particles can be stored in the dual hot/cold particle silo 1218. In this case, the dual hot/cold particle silo 1218 may be cooled by containing the cold particles and, consequently, cool any hot particles therein. In an example, the ducts that operate and high temperature to transport granular hot particles can be composed of concrete with reinforcement rebar and a refractory lining.

Figure 13A:
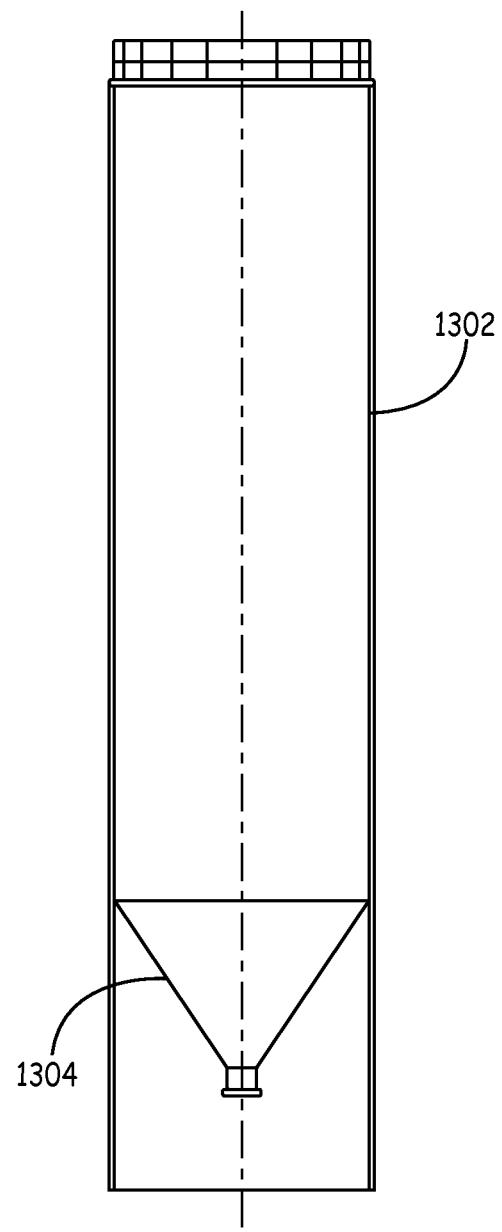
FIGS. 13A and 13B are cross-sectional views of example silos for use as a hot particle silo and cold particle silo respectively.
Figure 13B:
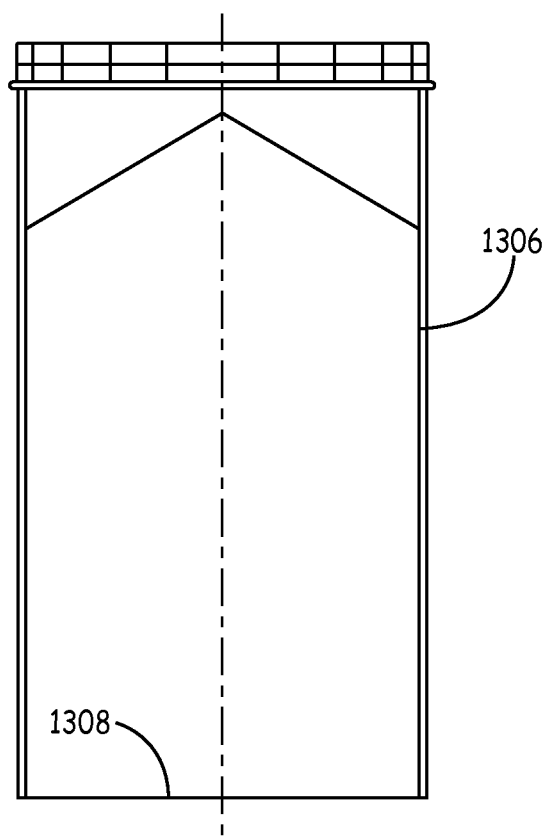

FIGS. 13A and 13B are cross-sectional views of example silos for use as a hot particle silo and cold particle silo respectively. FIG. 13A illustrates an example hot particle silo 1302. The hot particle silo 1302 is a cylindrical structure configured to have granular solid particles inserted into a top portion thereof, and to have the granular solid particles exit from a bottom portion thereof. The bottom 1304 of the hot particle silo 1302 has a geometry of an inverted cone. The inverted cone funnels the granular solid particles exiting the silo to a single location. FIG. 13B illustrates an example cold particle silo 1306. The cold particle silo 1306 also has a cylindrical structure. The cold particle silo 1306 is configured to have granular solid particles inserted into a top portion thereon, and to have the granular solid particles scooped from a top of the pile therein and removed from the top portion. The bottom 1308 of the cold particle silo 1306 is generally flat. In an example, the cold and hot particle silos 1302 and 1304 have a storage area height that is at least twice as larger as a storage area diameter.

Figure 14:
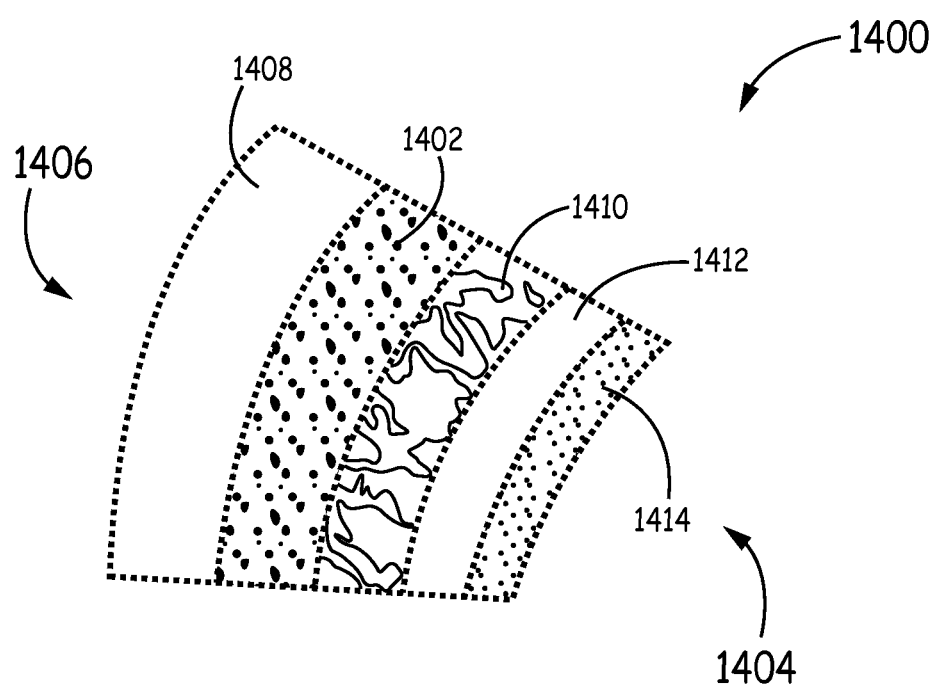
FIG. 14 is a top cross-sectional view of an example wall of a hot and/or cold particle silo.

FIG. 14 is a top cross-sectional view of an example wall 1400 of a hot and/or cold particle silo. The silo, especially the hot particle silo, is designed to provide thermal energy storage by containing the heat of the solid particles therein. In an example, the main structural material of the silos is concrete 1402. The silo wall 1400 includes several insulation layers on the inside 1404 of the concrete 1402 in order to maintain the concrete 1402 below allowable temperature for concrete. The wall 1400 also includes a layer of insulation 1408 on the outside 1406 of the concrete 1402 to control the temperature of the concrete 1402 and for protection of the concrete 1402.

In an example, the layer of insulation 1408 on the outside 1406 of the concrete 1402 can be composed of mineral wool. In an example, the inner layers on the concrete 1402 can include a layer of calcium silicate 1410 abutting the inside 1404 of the concrete 1402 and a layer of fire bricks 1412 or other refractory abutting the inside 1404 of the calcium silicate 1410. In some examples, the refractory lining can be sprayed onto the inside 1404 of the concrete 1402. Advantageously, a layer of particles 1414 can naturally form on the inside surface 1404 acting as an additional insulation layer. FIG. 14 illustrates example thicknesses for each of the layers 1408, 1410, 1412, 1414, as well as the concrete 1402. In this example, each of the layers 1408, 1410, 1412, 1414, as well as the concrete 1402 is about 0.5 m thick, however, the selected thickness may be different based on material usage and performance specifications. The insulation layers can be constructed from high-strength materials and attached to the concrete 1402 or to other layers of insulation. The concrete 1402 can comprise concrete with steel rebar or strand for structural integrity.

In another example, a silo can be constructed using a high-temperature concrete design having fewer layers on the inside thereof. A layer of mineral wool can be attached to the outside of the high-temperature concrete.

FIGS. 15A-15E are cross-sectional views of example dispensing valves to control the flow of particles out of the inverted cone bottom of the hot particle silo. Such a dispensing value can be connected to the inverted cone bottom and configured such that the flow from the inverted cone bottom is directed into the dispensing valve.

Figure 15E:
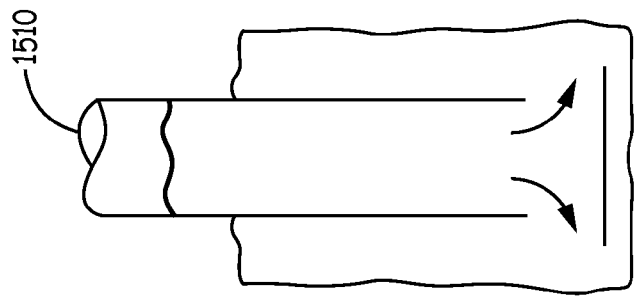
FIGS. 15A-15E are cross-sectional views of example dispensing valves to control the flow of particles out of the inverted cone bottom of the hot particle silo.
Figure 15D:
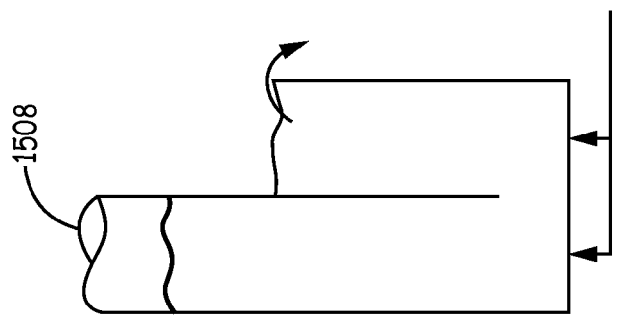
Figure 15C:
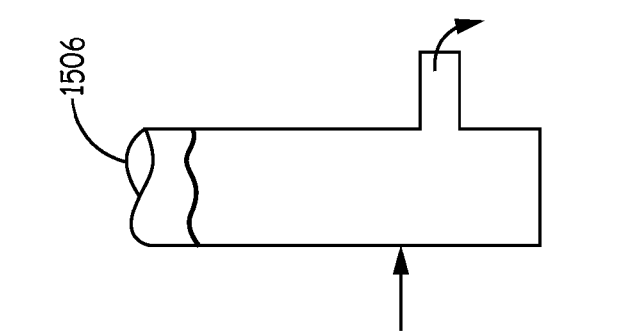
Figure 15B:
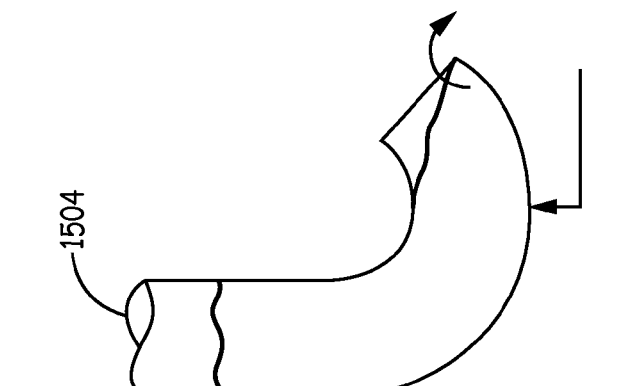
Figure 15A:
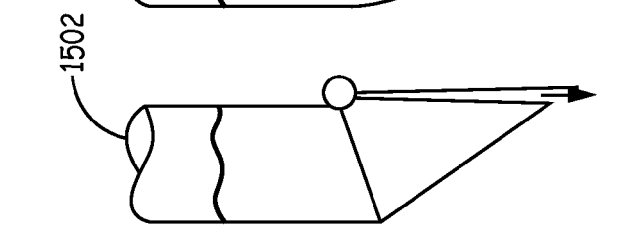

FIG. 15A illustrates an example tickle valve 1502. The tickle valve 1502 is configured to control the flow of solid particles by opening and closing a door covering the exit aperture of the tickle valve 1502. FIG. 15B illustrates an example J-valve 1504. The J-valve 1504 is configured to control the flow of solid particles by controlling the flow of a gas into the J-valve that forces particles out of the exit aperture. FIG. 15C illustrates an example L-valve 1506. The L-valve 1506 is also configured to control the flow of solid particles by controlling the flow of gas into the L-valve that forces particles out of the exit aperture. FIG. 15D illustrates an example loop seal 1508. The loop seal 1508 is also configured to control the flow of solid particles by controlling the flow of gas into the loop seal. FIG. 15E illustrates an example plate control 1510. The plate control 1510 is configured to control the flow of solid particles by opening and closing a plate covering the exit aperture of the valve 1510. The working mechanism for many of these valves uses gravity flow and agitation of the solid particles with the stream of gas at an optimized location for particle flow ability and control. In an example, the inverted cone bottom (e.g., hopper) from the hot particle silo 106 and the valve can be close to the main bed of the heat exchanger 108, for example particles dropping from the valve can feed directly into the heat exchanger 108. In some examples, particularly examples having a larger feeding distance of the solid particles from the hot particle silo 106 to the heat exchanger 108, pneumatic transportation of the solid particles from the hot particle silo 106 to the heat exchanger 108 can be used. In some examples refractory lined piping systems can be used for the pneumatic transportation of the solid particles to reduce erosion and provide thermal insulation.

Figure 16A:
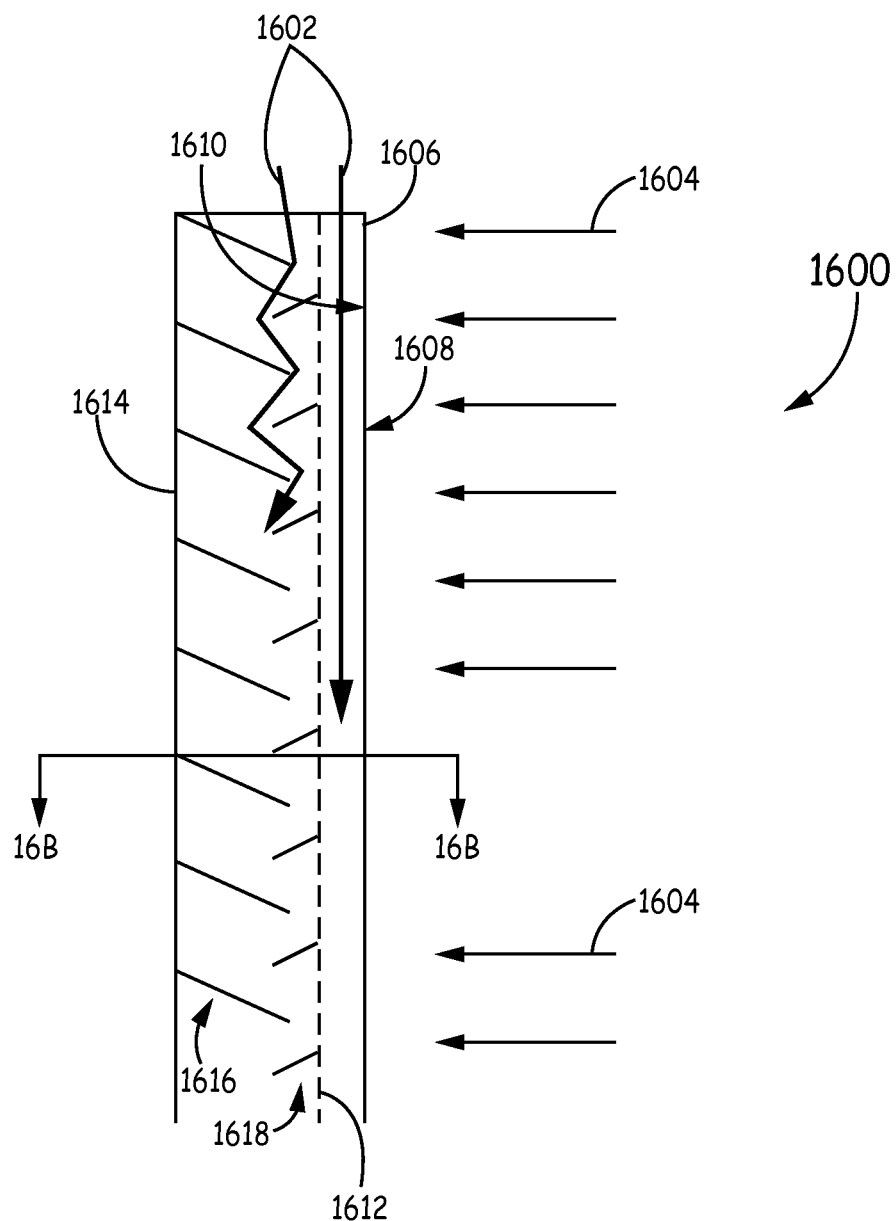
FIGS. 16A and 16B are cross-sectional views of an example solid particle receiver for use with any of the CSP systems of FIGS. 1-4, as well as other CSP systems.
Figure 16B:
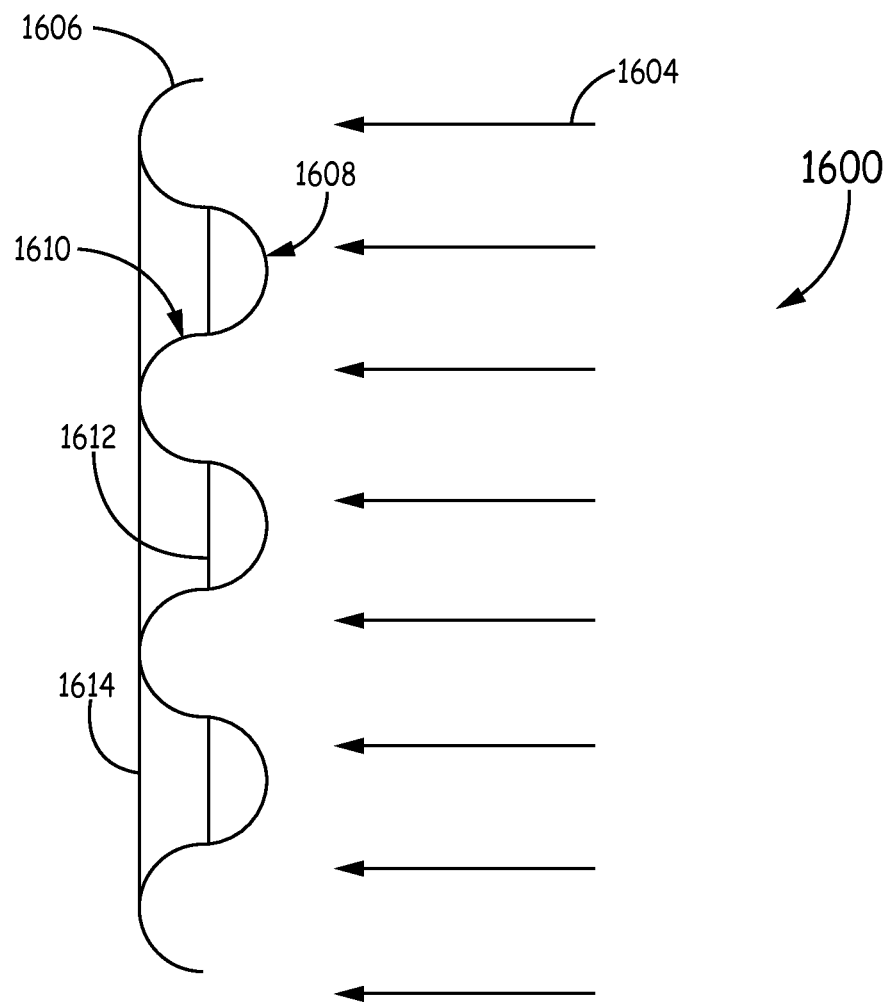

FIGS. 16A and 16B are cross-sectional views of an example solid particle receiver 1600 for use with any of the CSP systems 100-400 described above as well as other CSP systems. The solid particle receiver 1600 is also referred to herein as a "near black-body" (NBB) solar receiver. As described above, a solid particle receiver 1600 for use with the CSP systems 100-400 is configured to heat granular solid particles 1602 using energy from solar flux 1604 incident on the receiver 1600. In these examples, the solar flux 1604 is obtained from a reflector field 104 configured to reflect solar rays from a large area onto the receiver 1600. The receiver 1600 is configured to heat the granular solid particles 1602 as the particles 1602 pass therethrough using thermal radiation radiated from members of the receiver 1600. In particular, the members are configured to be heated by the incident solar flux 1604, causing the members to re-radiate thermal radiation for heating of the granular solid particles 1602. Accordingly, the granular solid particles 1602 are heated indirectly from the incident solar flux 1604.

The receiver 1600 defines one or more inner voids through which the granular solid particles 1602 pass. In an example, the receiver 1600 is configured to have the granular solid particles 1602 flow through the one or more voids using gravity flow. In an example, the receiver 1600 is configured such that the granular solid particles 1602 can be dropped into a top portion of the one or more voids and flow through the one or more voids to exit out of a bottom portion of the one or more voids. As the granular solid particles 1602 flow through the one or more voids, the granular solid particles 1602 are heated by thermal radiation from members of the receiver 1600.

FIG. 16A is a side cross-sectional view of the receiver 1600. The receiver 1600 includes a front member 1606 having an absorbing surface 1608 configured to have solar flux 1604 incident thereon and to absorb a majority (e.g., all or almost all) of the solar flux 1604. In an example, the front member 1606 is composed of a dark colored ceramic or is composed of a metal having a dual-band absorptive coating thereon to enable absorbing of a large percentage of the solar flux 1604.

The inside surface 1610 of the front member 1606, the surface 1610 that is reverse of the absorbing surface 1608, defines a portion of a first void of the receiver 1600. The first void is defined on the other side by an intermediate member 1612. The first void is configured to have solid particles 1602 passed therethrough as discussed above. As the front member 1606 absorbs solar flux 1604 incident on the absorbing surface 1608, the front member 1606 heats up, and emits thermal radiation from the inside surface 1610 into the first void. This thermal radiation from the inside surface 1610 is incident upon the solid particles 1602 passing through the first void to heat the solid particles 1602.

A second void is defined partially by the intermediate member 1612 and partially by a back member 1614. The second void is also configured to have solid particles 1602 pass therethrough. The second void includes a plurality of baffles configured to slow the downward flow of the granular particles 1602 through the second void. Slowing the downward flow of the solid particles 1602 can help to increase the amount of thermal radiation absorbed by the solid particles 1602 as they pass through the second void. The plurality of baffles comprise members that extend from the side surfaces of the second void into the second void and have a downward orientation. In this example, the plurality of baffles comprise a first set of baffles 1616 extending from the back member 1614 and a second set of baffles 1618 extending from the intermediate member 1612. The baffles 1616 in the first set extend interstitially between the baffles 1618 in the second set. This causes the solid particles 1602 to weave through the plurality of baffles in the second void. Since the solid particles contact and may slide along the plurality of baffles, the solid particles can acquire heat from the contact with the plurality of baffles. Additionally, the plurality of baffles can help to mix the solid particles 1602 enabling more even heating of the solid particles 1602.

FIG. 16B is a top cross-sectional view of the receiver 1600. As shown, the front member 1606 can have a waved shape to reduce reflection of solar flux 1604. Additionally, the outward arced portions of the front member 1606 can define the first void with the intermediate member 1612, and the inner arced portions of the front member 1606 can define the second void along with the intermediate member 1612 and the back member 1614. Since a portion of the inner surface 1610 defines the second void, the second void receives thermal radiation from the front member 1606 for heating of the solid particles 1602 passing therethrough. Although the receiver 1600 has been described for use with granular solid particles, in other implementations, the receiver 1600 can be used to heat up another heat transfer material, such as oil or molten salt. The wave shaped front member 1606 receives solar flux from the collector field, and partially collects the reflections from the recess of the front member 1606 to improve the receiver thermal efficiency.

Figure 17:
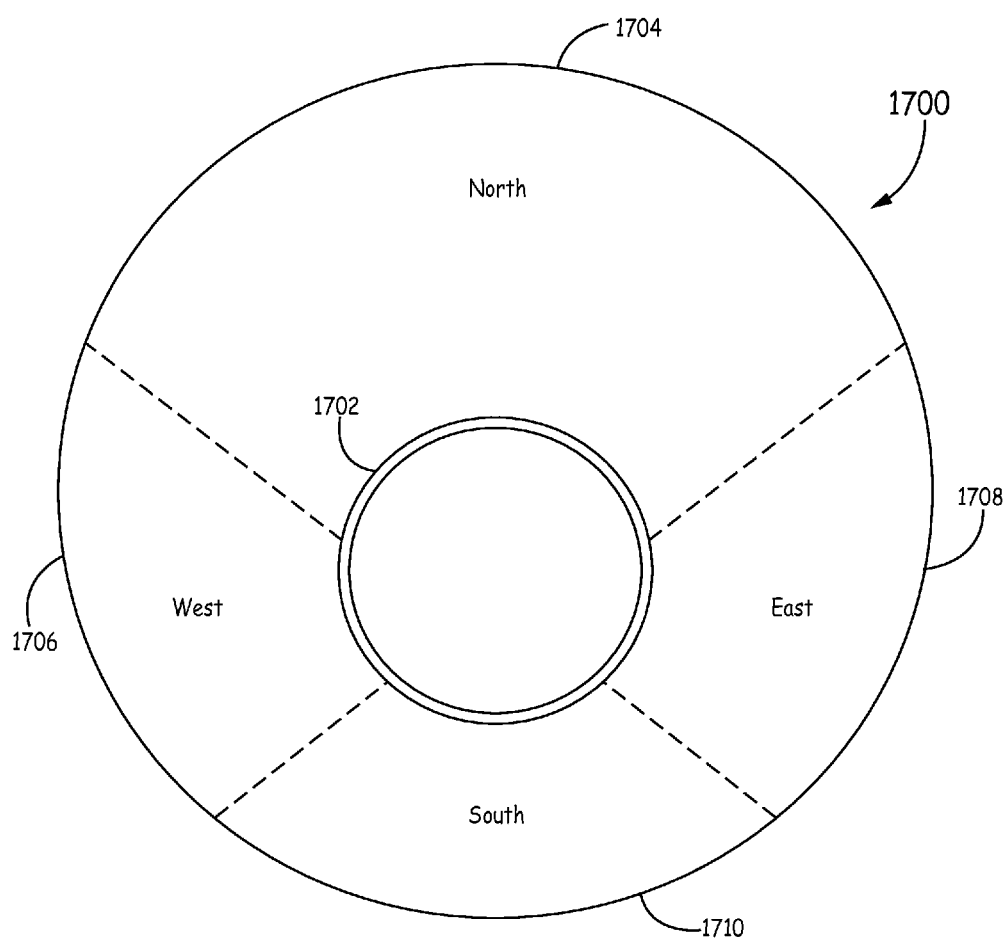
FIG. 17 is a top cross-sectional view of another solid particle receiver for use with any of the CSP systems of FIGS. 1-4, as well as other CSP systems.

FIG. 17 is a top cross-sectional view of another solid particle receiver 1700 for use with any of the CSP systems 100-400 described above as well as other CSP systems. The receiver 1700 is configured to absorb solar flux from a wide angle. More particularly, the receiver 1700 is configured to selectively operate (e.g., to selectively send granular particles through) one or more sections 1704, 1706, 1708, 1710 of the receiver 1700. Each section 1704, 1706, 1708, 1710, is configured to receive solar flux from a corresponding section of a reflector field. The north section 1704 is configured to receive power from reflectors located to the north of the receiver 1700, the west section 1706 to receive power from reflectors located to the west of the receiver 1700, the east section 1708 to receive power from reflectors located to the east of the receiver 1700, and the south section 1710 to receive power from reflectors located to the south of the receiver 1700. Each section 1704, 1706, 1708, 1710 can include one or more receivers 1600 as discussed above or one or more receivers having an array of absorber modules as discussed below. In an example, the west and north sections 1706, 1704 can be operated in a morning time period, all four sections 1704, 1706, 1708, 1710 can be operated around a noon time period, and the east and north sections 1704, 1708 can be operated in an evening time period. In this way, the one or more sections 1704, 1706, 1708, 1710 of the receiver 1700 can be selectively operated based on the location of the sun in the sky for more efficient operation. That is, the less efficient sections 1704, 1706, 1708, 1710 of the receiver 1700 are not operated. The receiver 1700 includes a hollow central portion 1702. The hollow central portion 1702 can be used to lift the solid particles or other heat transfer material to the top of the receiver 1700, such that the solid particles or other heat transfer material can be dropped through the voids of the receiver 1700 to be heated by thermal radiation therein.

Figure 18:
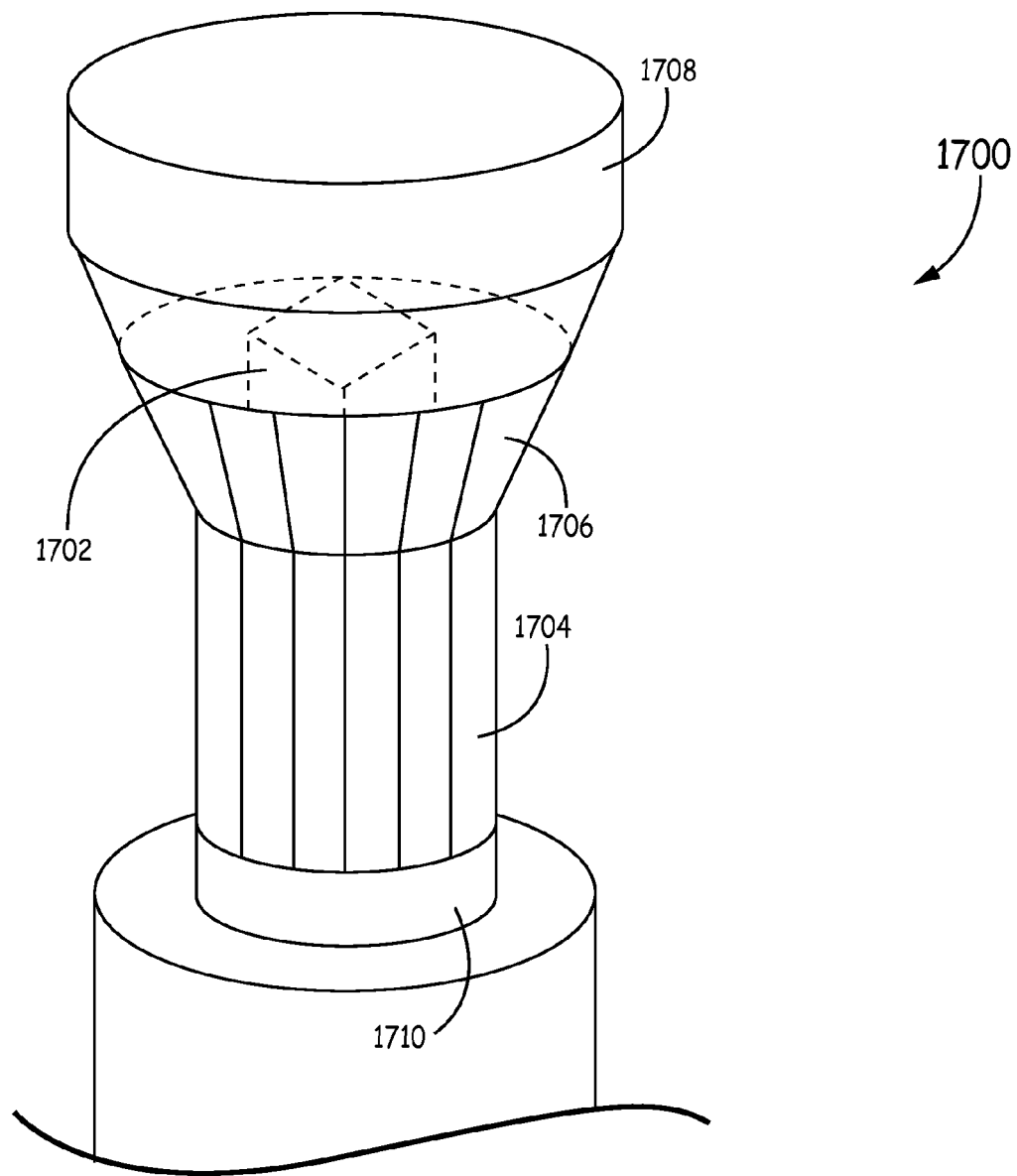
FIG. 18 is a perspective view of the receiver of FIG. 17.

FIG. 18 is a perspective view of the receiver 1700. FIG. 18 illustrates the location of the hollow central portion 1702 in the center of the receiver 1700 surrounded by an absorber surface 1704, 1706. One or more voids can be defined between the absorber surface 1704, 1706 and the central portion 1702 such that the solid particles or other heat transfer material can be lifted up through the central portion 1702 and dropped into the one or more voids defined between the central portion 1702 and the absorber surface 1704, 1706. In the example shown in FIG. 18, the absorber surface 1704, 1706 includes two sections. A lower section 1704 is oriented to face horizontally outward, and an upper section 1706 is oriented to face partially downward. The lower section 1704 which faces more horizontal than the upper section 1706 can more effectively absorb solar flux from reflectors that are farther away from the receiver 1700. The upper section 1706, meanwhile, faces more downward to more effectively absorb solar flux from reflectors that are nearer to the receiver 1700. The receiver 1700 also includes a top particle dispenser 1708 to distribute solid particles throughout the receiver 1700 as appropriate, and a particle collection area 1710 which directs the solid particles exiting the receive 1700 to the downcomer from the receiver 1700. In an example, the height of the receiver 1700 from particle collection area 1710 to particle dispenser 1708 is about 20 meters.

Figure 19:
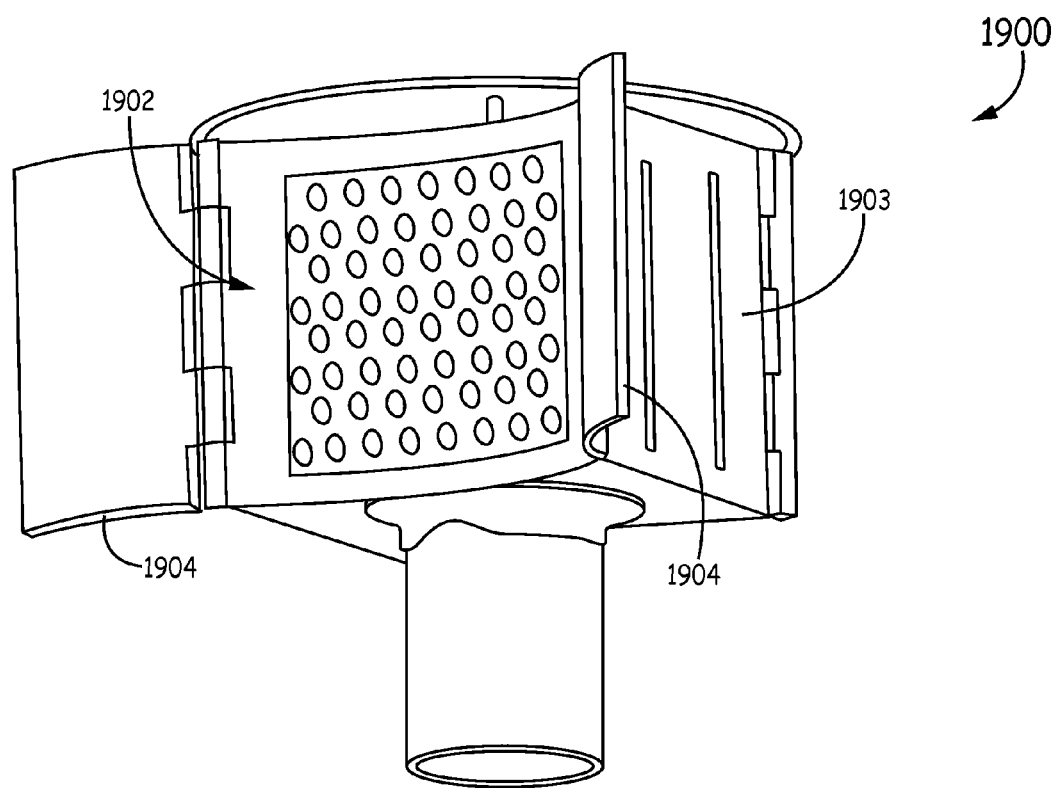
FIG. 19 is a perspective view of another example receiver for use with any of the CSP systems of FIGS. 1-4, as well as other CSP systems.

FIG. 19 is a perspective view of another example receiver 1900 for use with any of the CSP systems 100-400 described above as well as other CSP systems. The receiver 1900 includes a plurality of open-ended solar flux absorbers 1902 as an absorbing surface and a housing 1903 to which the plurality of absorbers 1902 are attached and housed. Each of the solar flux absorbers 1902 comprise a geometric structure having an open end that is oriented to receive solar flux from a solar flux reflector field 104, and a closed-end opposite the open end. Each solar flux absorber 1902 is configured to receive the solar flux in the open end such that the solar flux is incident on an internal surface of the geometric structure formed by the solar flux absorber 1902. Some or all of the internal surfaces of each solar flux absorber 1902 are configured to absorb the solar flux incident thereon. In an example, the plurality of open-ended flux absorbers 1902 are oriented in a two-dimensional array as shown in FIG. 19.

The plurality of absorbers 1902 are spaced apart from one another and in combination with the housing 1903 define one or more voids through with granular solid particles or another heat transfer material can flow. Space between the plurality of absorbers 1902 in the one or more voids enables the solid particles or other heat transfer material to flow between some or all adjacent absorbers 1902. In this way, the absorbers 1902 can absorb incident solar flux causing the absorbers 1902 to heat up. Heating up the absorbers 1902 causes the absorbers 1902 to emit thermal radiation to an interior of the receiver 1900 which, in turn, heats up the solid particles or other heat transfer material flowing therethough. The other heat transfer material can include a liquid, a liquid salt for example, or a gas, for example air. The receiver 1900 also includes one or more optional doors 1904 that can close to cover the open ends of the plurality of absorbers 1902 and can open to expose the open ends of the plurality of absorbers 1902. The doors 1904 can be closed during periods of non-use, such as during periods when low amounts of solar flux are available, to prevent dirt or animals from entering into the open ends of the absorbers 1902. The doors 1904 can also be position to block wind on the absorbers 1902 and thereby reduce heat loss. Closing the doors at night may also reduce daily thermal-cycle depth. In other examples, particles such as hot or slightly warm particles can be circulated through the receiver to maintain the absorber's heat. Although the receiver 1900 illustrated in FIG. 19 shows absorbers 1902 configured to receiver solar flux from a single side only, it should be understood that in other examples, the receiver 1900 can have absorbers 1902 around a large portion of its sides such that the absorbers 1902 are configured to receive solar flux from a wide angle around the receiver 1900 as described with respect to FIG. 17.

Figure 20:
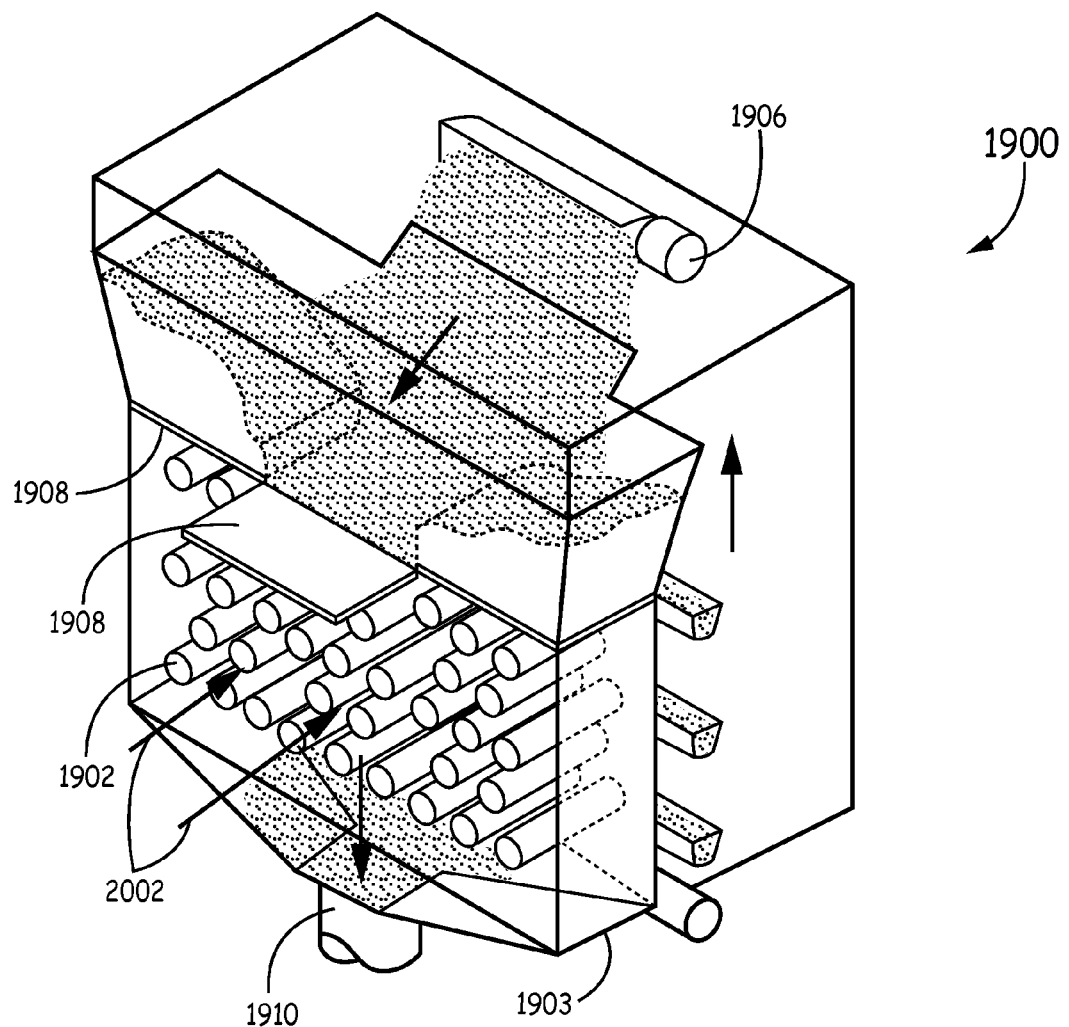
FIG. 20 is see-through view of the receiver of FIG. 19.

FIG. 20 is a see-through view of the receiver 1900. In this example, each of the absorbers 1902 has a cylindrical geometry that is open on one end. The open end of the cylinder is oriented to receive solar flux 2002 from the reflector field 104.

The closed end of the cylinder is reverse of the open end. In the example shown in FIG. 20, the cylindrical absorber has rounded sides; however, in other examples, the cylindrical absorber can be composed of a plurality of defined sides such as in a hexagon, square, or diamond shape. In an example the cylindrical absorber 1902 has a generally horizontal orientation such that the open end is generally normal to the horizon. In some examples, the cylindrical absorber 1902 is oriented such that the open end faces at a downward angle to better receiver solar flux from the reflector field 104 and to reduce dirt and other material buildup in the absorber 1902. FIG. 20 also illustrates the void(s) between the absorbers 1902 through which the solid particles or other heat transfer material can pass between adjacent absorbers 1902. As can be seen, the absorbers 1902 can receive solar flux in an open end thereof and absorb the solar flux at an interior surface of the cylinder. Once the absorbers 1902 heat up, the absorbers 1902 can emit thermal radiation from an exterior surface of the cylinder, and the solid particles or other heat transfer material can pass proximate (e.g., between) the exterior surfaces of adjacent absorbers 1902 and absorb the thermal radiation emitted thereby.

The receiver 1900 can also include a bucket lifter 1906 configured to lift the solid particles up to the top of the receiver 1900 and drop the solid particles into the one or more voids proximate (e.g., between) the absorbers 1902. The receiver 1900 can also include one or more orifice plates 1908 configured to open and close to control the flow of solid particles into the receiver 1900. In an example, the one or more orifice plates 1908 include two or more (e.g., three) orifice plates 1908 adjacent to one another, wherein each orifice plate 1908 can be opened and closed to control a flow of solid particles through a respective section of the plurality of absorbers 1902. The orifice plates 1908 can be controlled based on the amount of solar flux available to the receiver 1900. For example, when less solar flux is available a subset of the orifice plates 1908 (e.g., the center orifice plate) can be set open while the other orifice plates 1908 can be set closed. Additional orifice plates 1908 can be set open as additional solar flux is available. Thus, the magnitude of the flow of solid particles through the receiver 1900 can be controlled based on the solar flux using the orifice plates 1908. The receiver 1900 can also include a downcomer 1910 to direct the solid particles exiting the receiver 1900.

In an example, the housing 1903 is composed of a ceramic, such as but not limited to silicon-carbide. In another example, the housing 1903 is composed of metal. In an example, the absorbers 1902 are composed of a ceramic, such as but not limited to silicon-carbide. In other examples the absorbers 1902 are composed of metal, for example, having a dual-band absorptive coating thereon. In some examples, both the housing 1903 and the absorbers 1902 are composed of ceramic. In other examples, one or both of the housing 1903 and the absorbers 1902 can be composed of metal. The use of an all ceramic or partially ceramic void-style receiver 1900 and heat exchanger 108 can enable the limit of thermal power conversion to be extended to a higher level, while at the same time reducing the cost for system components.

Figure 21:
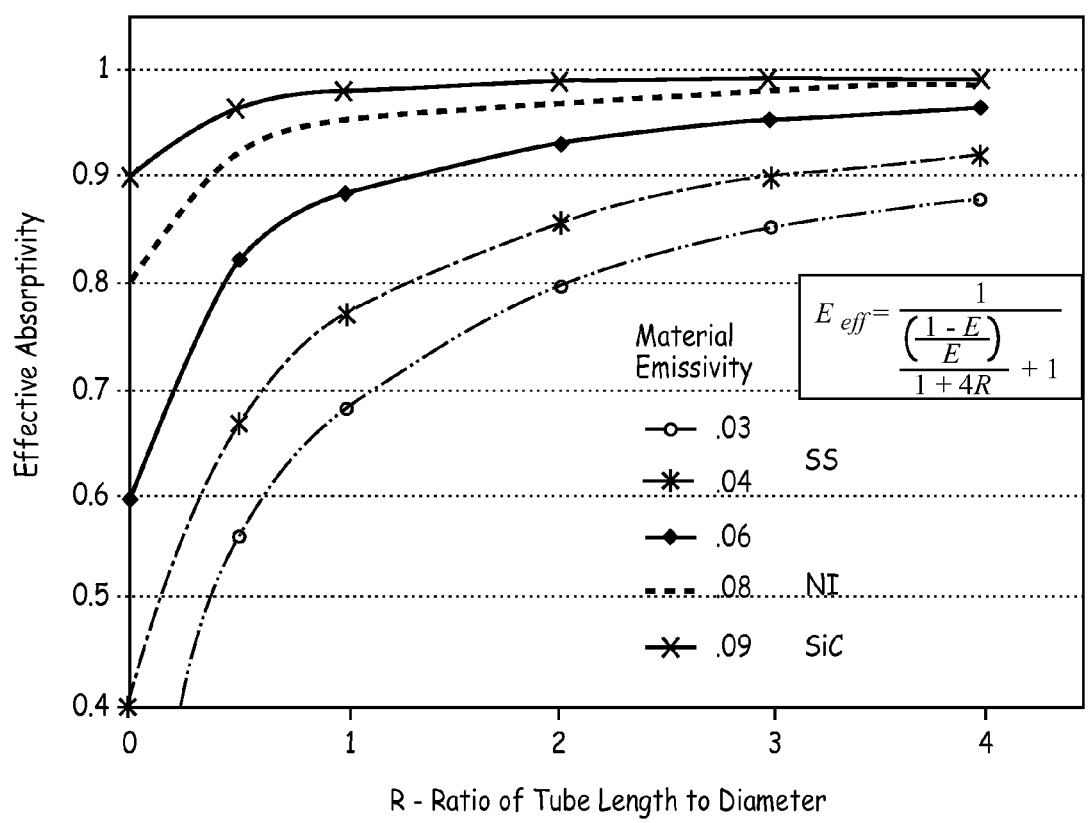
FIG. 21 is a graph illustrating the effective absorptivity of a cylindrical absorber with respect to the ratio of the absorbers length (open end to closed end) vs. the absorbers diameter.

FIG. 21 is a graph illustrating the effective absorptivity of a cylindrical absorber 1902 with respect to the ratio of the absorbers length (open end to closed end) vs. the absorbers diameter. In an example, the aspect ratio of a length of each absorber 1902 over a diameter of the absorber 1902 is between 1 and 15. In the example shown, the effective emissivity of the absorber 1902 can be greater than 0.99 for any aspect ratio greater than 3. For an aspect ratio of 2, the effective emissivity is 0.988. The aspect ratio for a given receiver design can be selected to accomplish high effective absorptivity and heat transfer and to cause an appropriate flow pattern for the solid particles or other heat transfer material resulting in sufficient temperature rise of the solid particles.

Figure 22:
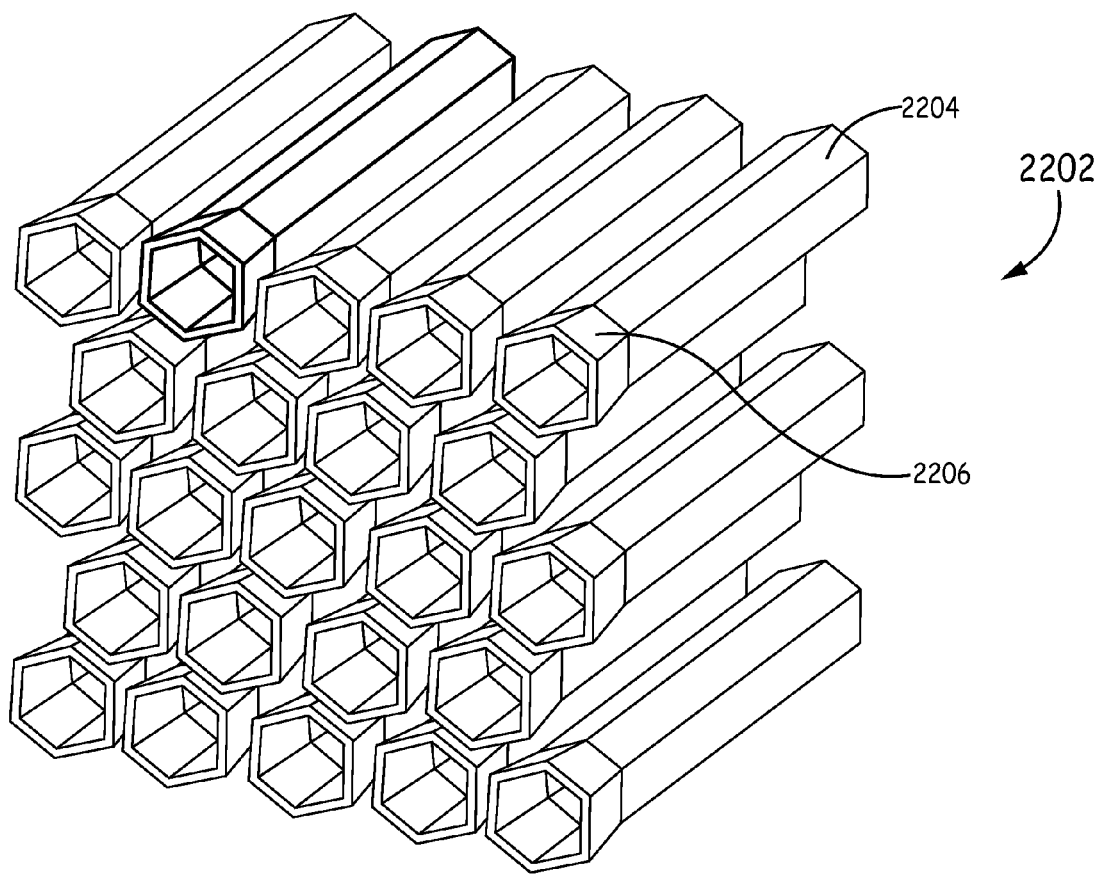
FIG. 22 is a perspective view of example absorbers for use in the receiver of FIG. 19 or other solid particle receivers.

FIG. 22 is a perspective view of an array of a plurality of example absorbers 2202 for use in the receiver 1900 or other receivers. The absorbers 2202 comprise have a generally cylindrical geometry with a hexagonal cross-section. The absorbers 2202 are composed of a body portion 2204 and a mouth portion 2206 where the body portion 2204 has six sides and the mouth portion 2206 has six beveled surfaces. The mouth portion 2206 defines the open end of the absorber 2202 and is flared outward from the body portion 2204 toward adjacent absorbers 2202 forming a wider opening for the absorber 2202. That is, the body portion 2204 has a smaller diameter than the mouth portion 2206. The mouth portion 2206 enables the absorbers 2202 to be spaced apart, yet still receive solar flux incident on the area between the body portions 2204 of the absorbers 2202. The open end of the body portion abuts the mouth portion 2204. The mouth portion 2206 comprises beveled surfaces with respect to the body portion 2204 that flare outward from the body portion 2204. The beveled surfaces extend in the hexagon shape enabling adjacent absorbers 2202 to align with adjacent beveled surfaces of adjacent absorbers 2202.

In an example, the absorbers 2202 can be staggered vertically across different rows as shown in FIG. 22. That is, an absorber 2202 in a row below two other absorbers 2202 can be disposed below the space between the two other absorbers 2202. Each of the absorbers 2202 can be staggered in this way. This helps to blend and slow the flow of the solid particles as they pass between and around the absorbers 2202. Slowing the flow of solid particles extends the residence time of the solid particles in the receiver. During flow, the solid particles can impinge on the absorbers 2202 to absorb heat therefrom and take advantage of impingement enhancement in heat transfer. In an example, the absorbers 2202 can provide low reflection, radiation, and convection losses, and can achieve >95% receiver thermal efficiency at >700° C. In an example, the absorbers 2202 are composed of ceramic, such as silicon-carbide.

Figure 23:
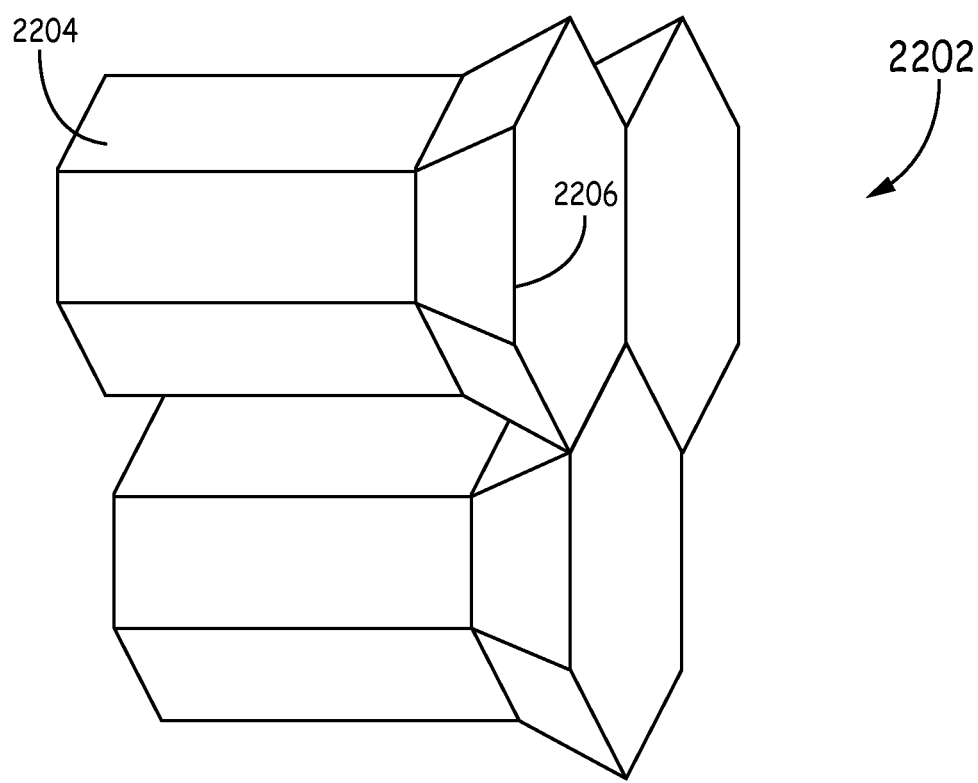
FIG. 23 is a zoomed in perspective view of portions of three of the absorbers.

FIG. 23 is a zoomed in perspective view of portions of three of the absorbers 2202. As shown in FIG. 23, the mouth portions 2206 can form structure disposed between open ends of the absorbers 2202 to close off the space between the open ends. This structure along with the housing 1903 can define the one or more voids which the solid particles pass through. As shown, the hexagonal shape cross-section and the hexagonal shape mouth portion 2206 enables beveled surfaces of an absorber 2202 to align with beveled surfaces of adjacent absorbers 2202.

Figure 24:
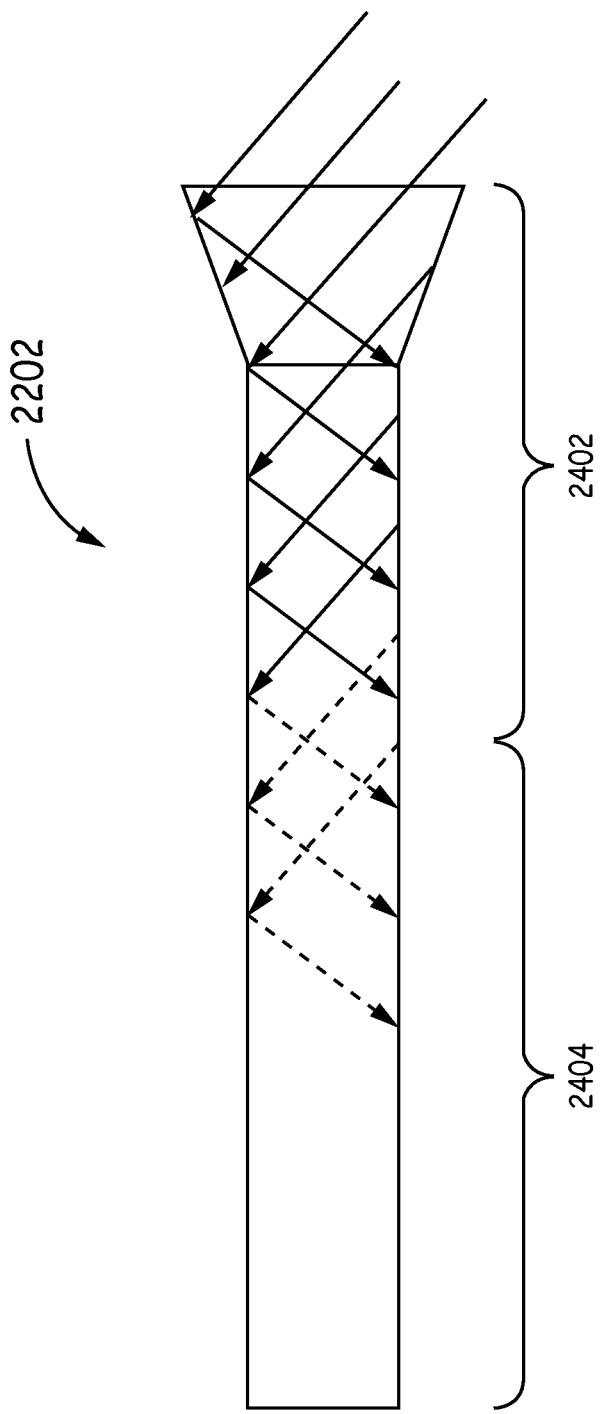
FIG. 24 is a cross-sectional view of an absorber.

FIG. 24 is a cross-sectional view of an absorber 2202. As shown, the interior surface of the absorber 2202 can be composed of a reflective section 2402 and an absorptive section 2404. The reflective section 2402 has a reflective surface configured to reflect a majority (e.g., all or almost all) of the solar flux incident thereon. The absorptive section 2404 has an absorptive surface configured to absorb a majority (e.g., all or almost all) of the solar flux incident thereon. The reflective section 2402 is disposed proximate the open end of the absorber 2202 and the absorptive section 2404 is disposed proximate the closed end of the absorber 2202. In an example, the mouth portion 2206 is configured as a reflective section 2402 along with some of the adjacent body portion 2204, while the remaining body portion proximate the close end is configured as the absorptive section 2404. This enables the solar flux incident on the mouth portion 2206 to be reflected further into the body portion 2204 of the absorber 2202 thereby spreading the heating effect of the solar flux deeper into the absorber 2202.

Figure 25:
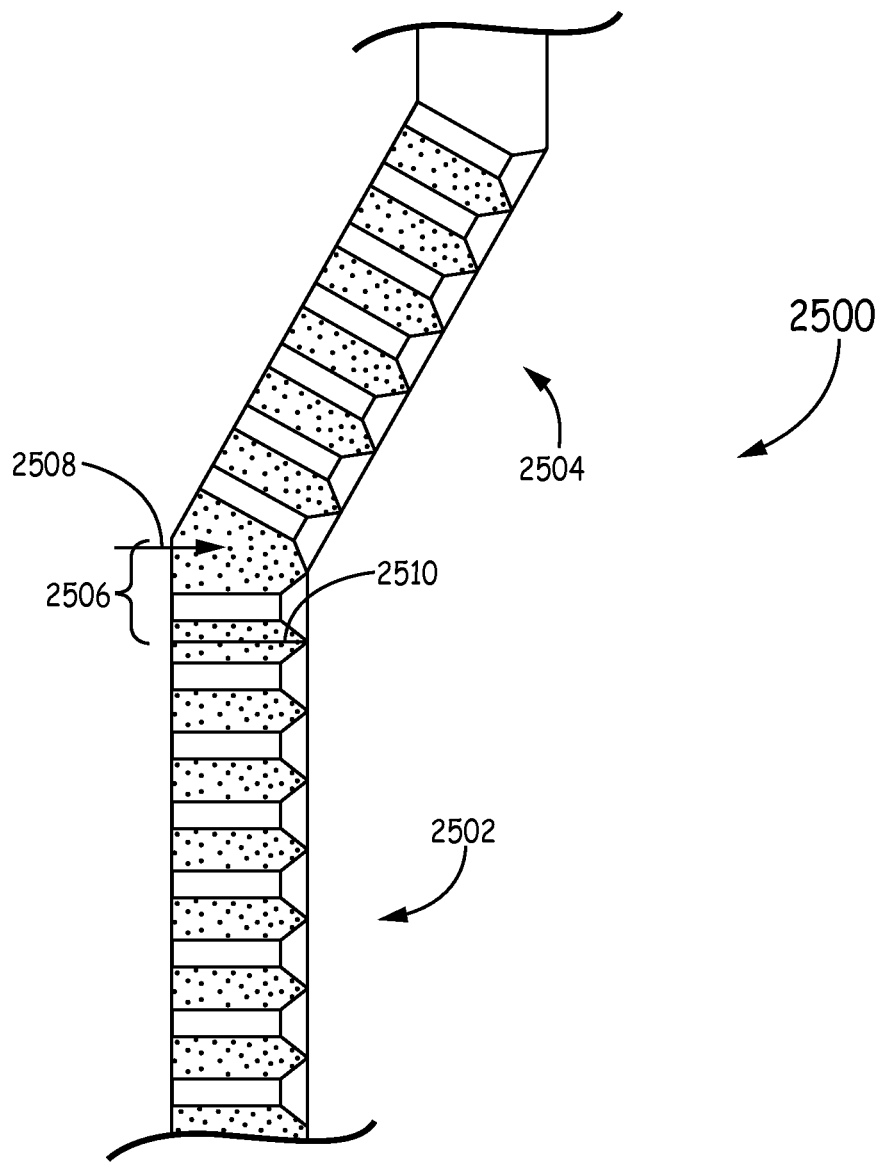
FIG. 25 is a cross-sectional view another example solid particle receiver for use with any of the CSP systems of FIGS. 1-4, as well as other CSP systems.

FIG. 25 is a cross-sectional view another example solid particle receiver 2500 for use with any of the CSP systems 100-400 described above as well as other CSP systems. The receiver 2500 includes a plurality of absorbers in the same manner as discussed above with respect to receiver 1900. The receiver 2500, however, includes two sections of absorbers, a lower section 2502 including absorbers having a generally horizontal orientation, and an upper section 2504 including absorbers having a downward angled orientation. Similar to the receiver discussed with respect to FIG. 18, the lower section 2502 is configured to receive solar flux from reflectors that are farther away from the receiver 2500 and the upper section 2504 is configured to receive solar flux from reflectors that are closer to the receiver.

Due to the change in angle between the upper section 2504 and the lower section 2502 a dense particle zone 2506 may develop at the junction. In some examples, the receiver 2500 can include a perforated tube 2508 to introduce fluidization gas into the dense particle zone 2506 to aid in maintaining the flow of the solid particles therethrough. The receiver 2500 can also include one or more orifice plates 2510 at the dense particle zone to control the flow of particles between the upper section 2504 and the lower section 2502. The orifice plate(s) 2510 may be used to isolate the upper section 2504 from the bottom section 2502 for fluidization purposes. In an example, the absorbers in the upper section 2504 are composed of steel and the absorbers in the lower section 2502 are composed of a ceramic, such as silicon carbide.

Figure 26:
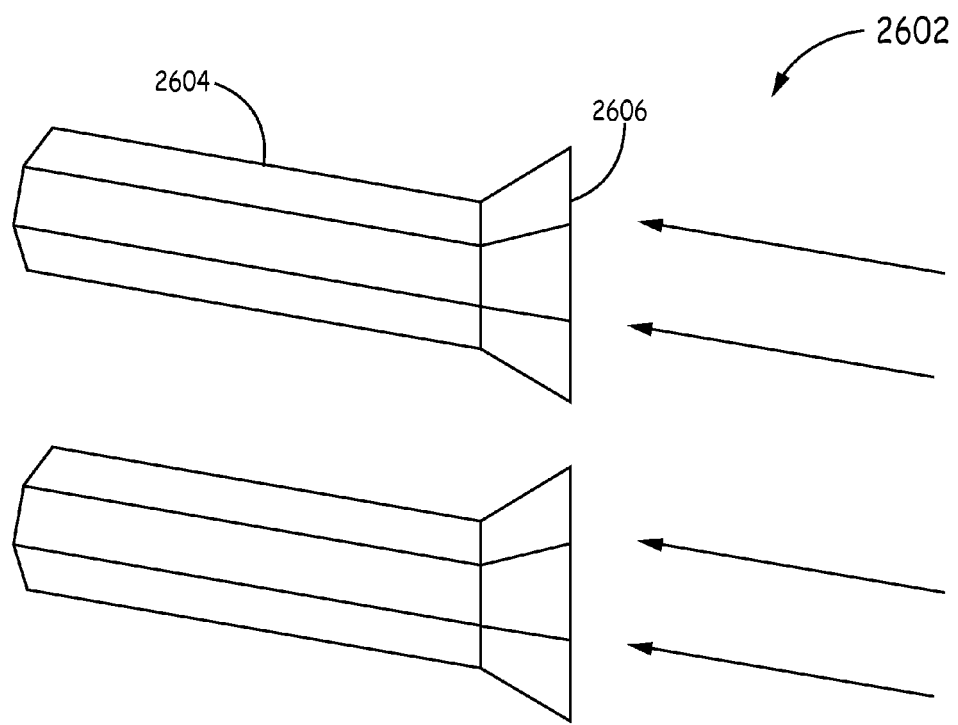
FIG. 26 is a cross-sectional view of example absorbers for use with the receiver of FIG. 19 or other solid particle receivers.

FIG. 26 is a cross-sectional view of example absorbers 2602 for use with either receiver 1900 or receiver 2500. The absorbers 2602 include angles body portions 2604 with respect to their mouth portions 2606. This enables the mouth portions 2606 to be oriented generally horizontally, while body portion 2604 can be oriented such that the open end is lower than the closed end. This orientation can effectively capture solar flux and can aid in distributing solid particles flowing around the absorbers 2602 toward the mouth portion 2606 of the absorbers 2602.

Figure 27A:
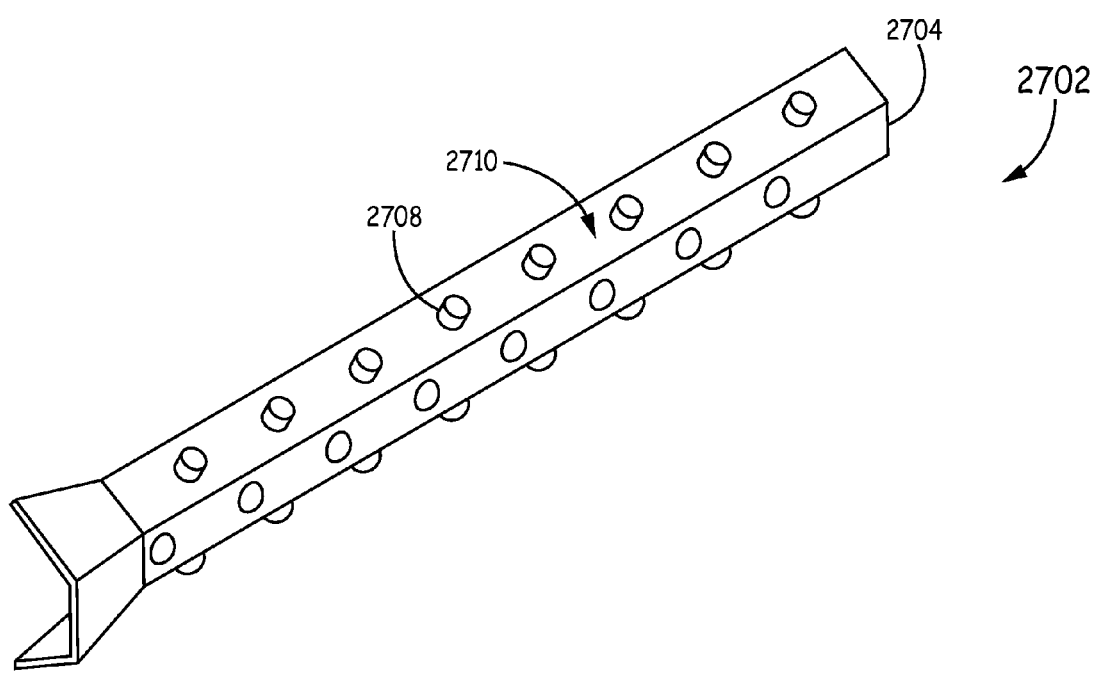
FIG. 27A is a partial perspective view of another example absorber for use with receiver of FIG. 19 or other solid particle receivers.
Figure 27B:
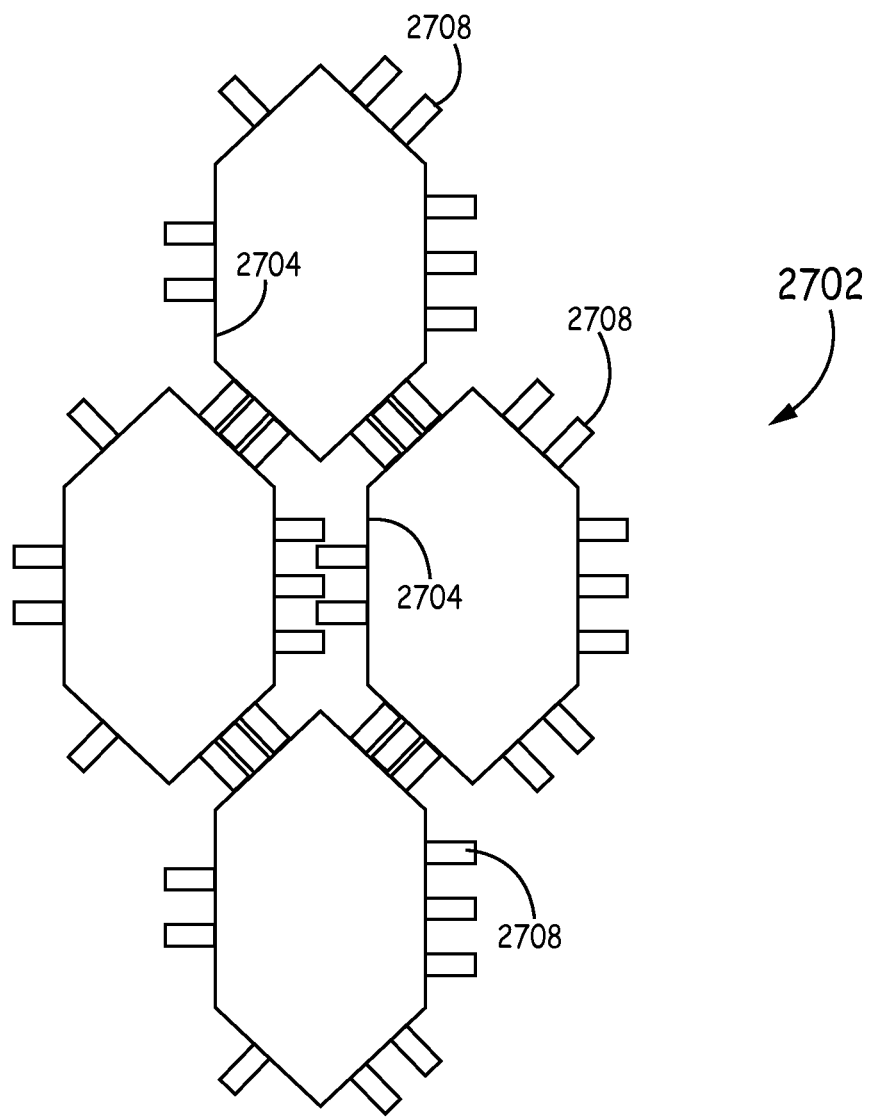
FIG. 27B is a cross-sectional view of a portion of a receiver including a plurality of absorbers.

FIG. 27A is a partial perspective view of another example absorber 2702 for use with receiver 1900 or other solid particle receivers. The absorber 2702 includes a plurality of features 2708 on the exterior surface 2710 of the body portion 2704. The plurality of features 2708 extend from the body portion 2704 into the space between adjacent absorbers 2702. In an example, each of the plurality of absorbers 2702 includes such features 2708. FIG. 27B is a cross-sectional view of a portion of a receiver including a plurality of absorbers 2702. As shown, the plurality of features 2708 can occupy the spaces between absorbers 2702 to blend the solid particles or other heat transfer medium passing therethrough. The features 2708 can also break clusters of solid particles and enhance particle/absorber heat transfer rate.

Figure 28:
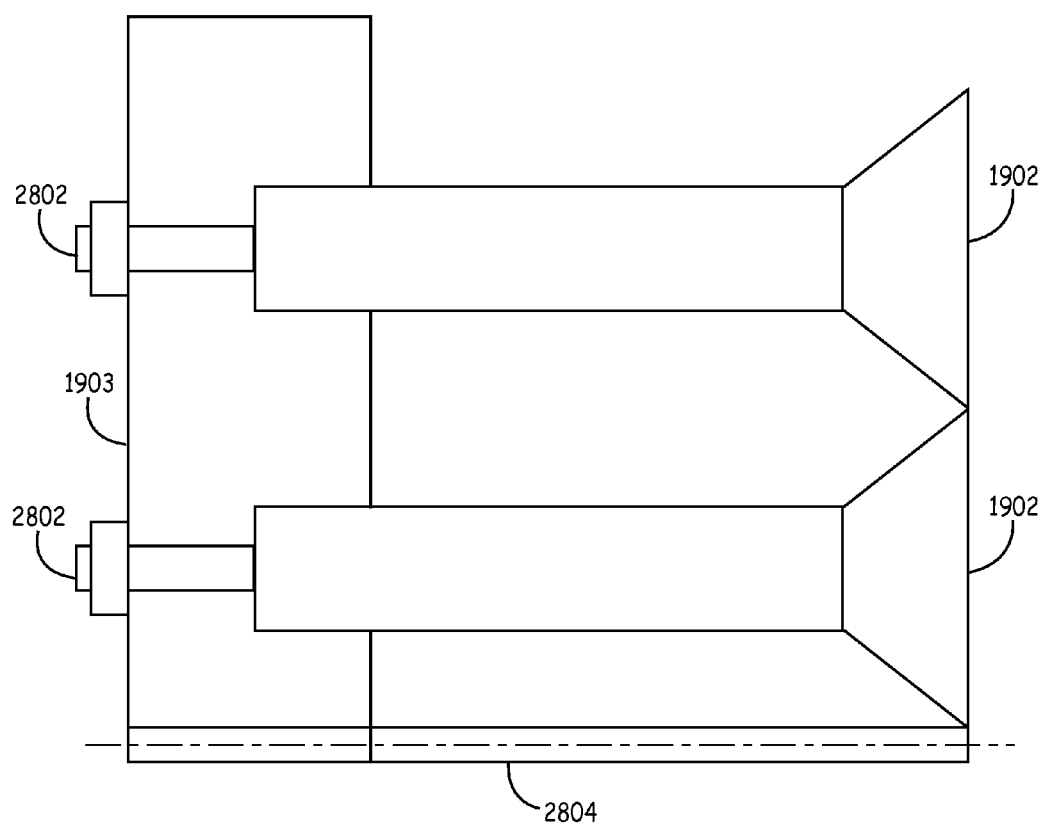
FIG. 28 is a cross-sectional view of an example of two absorbers mechanically attached to the housing.

FIG. 28 is a cross-sectional view of an example of two absorbers 1902 mechanically attached to the housing 1903. The absorbers 1902 are attached to the housing 1903 proximate the closed end of the absorbers 1902. The absorbers 1902 can be bonded to one another proximate the open end of the absorbers 1902, for example, at abutting beveled surfaces of the mouth portions. Such a bond can be made using refractory bonding or high temperature cement. The absorbers 1902 are attached to the housing 1903 using a feature 2802 that is casted or sintered to the housing 1903. In some examples, support members 2804 can extend from the housing 1903 to the open end of the absorbers 1902 to provide additional support for the open end of the absorbers 1902.

Figure 29:
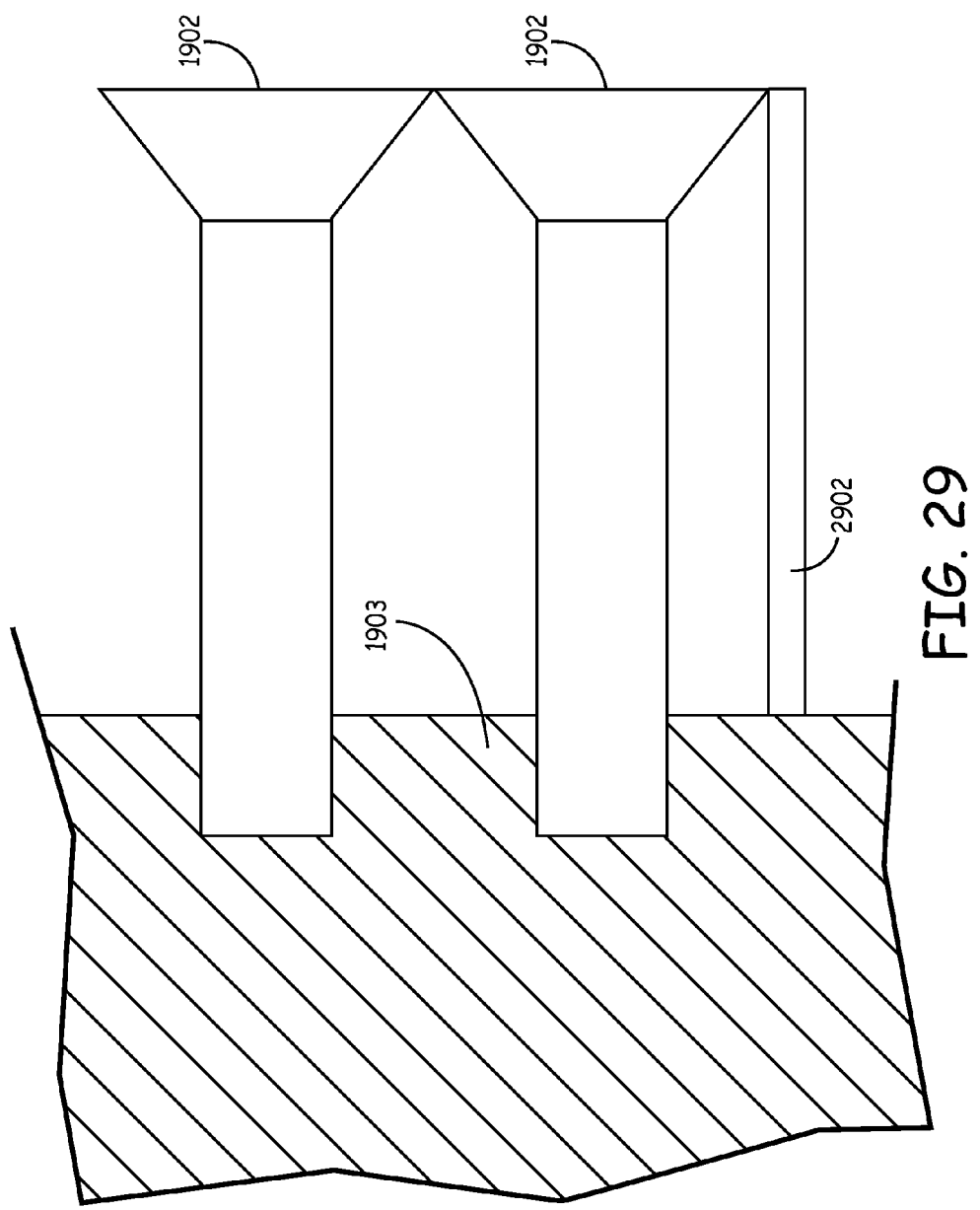
FIG. 29 is a cross-sectional view of another example of two absorbers bonded to the housing.

FIG. 29 is a cross-sectional view of another example absorbers 1902 bonded to the housing 1903. The absorbers 1902 are bonded to the housing 1903 proximate the closed end of the absorbers 1902. The absorbers 1902 can also be bonded to one another proximate the open end of the absorbers, for example, at abutting beveled surfaces of the mouth portions. Such a bond can be made using refractory bonding or high temperature cement. The absorbers 1902 are bonded to the housing 1903 using any suitable glue. In some examples, support members 2902 can extend from the housing 1903 to the open end of the absorbers 1902 to provide additional support for the open end of the absorbers 1902.

Proper geometric dimensions and tolerances can be selected to accommodate heating/cooling cycle of the absorbers 1902 and to contain the solid particles such that they do not leak out between adjacent mouth portions of adjacent absorbers 1902 during such heating/cooling cycle. In an example, hot particles can be passed through the receiver to preheat the receiver during startup.

In some examples, any of the receivers discussed above can be configured to have a fluidization gas introduced therein to fluidize or partially fluidize solid particles passing therethrough. Such a receiver can include a seal around the one or more voids to enhance the ability of the fluidization gas to fluidize the solid particles.

In some examples, the receivers can have oblong cross-sections (e.g., either oblong round or hexagonal) with the longer diameter of the oblong cross-section oriented vertically.

The high operating and storage temperatures achievable with the disclosed systems and methods will provide for highly efficient power-cycle electric generation and larger storage capacity. Another possible implementation of the disclosed embodiments is high efficiency, low cost, high capacity energy storage to complement wind generation, and storing the excess energy by shifting wind off-peak generation to peak hours increase value of the renewable power generation to make it possible for wind and solar to provide on-demand base-load power production. Many elements of the CSP system and method embodiments described above are operated at extremely high temperatures to achieve maximum efficiency.

The receiver embodiments disclosed herein can be used to heat thermally stable granular solid particles to more than 1000° C., which would improve the energy conversion efficiency of concentrated solar power generation. The potential use of ceramics to fabricate some or all of the high temperature elements of the NBB receiver design makes overall system cost significantly lower than current receivers utilizing high-grade steel or nickel alloy structures.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A concentrating solar power system comprising:
   a solar flux receiver to heat solid particles dropped therethrough using energy from concentrated solar flux incident on the solar flux receiver; and
   a fluidized-bed heat exchanger to receive solid particles heated by the solar flux receiver, fluidize the solid particles to form a gas-solid fluid, and transfer heat from the gas-solid fluid to a working fluid, wherein:

the fluidized-bed heat exchanger includes a stackup hybrid boiler having a stationary bed super heater with a turbulent bed evaporator on top of the stationary bed super heater, and a fast bed preheater on top of the turbulent bed evaporator, and a gas-solid separator to separate the solid particles from gas in the gas-solid fluid after the gas-solid fluid has passed through the fast bed preheater.

2. The concentrating solar power system of claim 1, wherein the gas-solid separator is a cyclone separator.

3. The concentrating solar power system of claim 1, further comprising:

a cold particle silo to receive the solid particles from the gas-solid separator.

4. The concentrating solar power system of claim 3, wherein concrete is the primary structural material of the cold particle silo.

5. The concentrating solar power system of claim 3, further comprising:

a lift mechanism to transport the solid particles from the cold particle silo and drop the solid particles into the solar flux receiver.

6. The concentrating solar power system of claim 5, wherein the lift mechanism is a bucket conveyor.

7. The concentrating solar power system of claim 3, further comprising:

a hot particle silo to receive the solid particles from the solar flux receiver, wherein the solid particles are removed from the hot particle silo and transported to the fluidized-bed heat exchanger.

8. The concentrating solar power system of claim 7, wherein concrete is the primary structural material of the hot particle silo.

9. The concentrating solar power system of claim 7, wherein the hot particle silo is disposed lower in height than the solar flux receiver such that the solid particles can drop from the solar flux receiver into the hot particle silo.

10. The concentrating solar power system of claim 1, wherein the gas-solid separator is disposed at a height above the solar flux receiver such that the solid particles from the gas-solid separator can drop from the gas-solid separator to the solar flux receiver.

11. The concentrating solar power system of claim 1, further comprising:

a compressor to receive the gas from the gas-solid separator, compress the gas, and provide the gas to the fluidized-bed heat exchanger for fluidizing the solid particles therein.

12. The concentrating solar power system of claim 1, wherein the solid particles enter the stationary bed super heater and are fluidized to form the gas-solid fluid, wherein the gas-solid fluid is forced upward through the turbulent bed evaporator and the fast bed preheater.

13. The concentrating solar power system of claim 1, wherein the fluidized-bed heat exchanger includes a pressurized system having a pressure chamber in which the solid particles are fluidized.

14. The concentrating solar power system of claim 13, wherein concrete is the primary structural material of the pressure chamber.

15. The concentrating solar power system of claim 1, further comprising:

a power cycle to generate electricity from heat in the working fluid, wherein the power cycle comprises one of a supercritical steam Rankine cycle, an advanced supercritical-carbon dioxide Brayton cycle, a gas turbine cycle, or a gas turbine combined cycle.

16. A concentrating solar power system comprising:

a solar flux receiver to heat solid particles dropped therethrough using energy from concentrated solar flux incident on the solar flux receiver; and a fluidized-bed heat exchanger to receive solid particles heated by the solar flux receiver, fluidize the solid particles with a gas to form a gas-solid fluid, and transfer heat from the gas-solid fluid to a working fluid, wherein:

the fluidized-bed heat exchanger includes a cascading boiler having a stationary bed super heater with a turbulent bed evaporator beside the stationary bed super heater, and a bubbling bed preheater beside the stationary bed boiler, wherein the bubbling bed preheater outputs the solid particles separate from the gas.

17. The concentrating solar power system of claim 16, wherein the solid particles enter the stationary bed super heater and are fluidized to form the gas-solid fluid, wherein the gas-solid fluid is forced sideways through the turbulent bed evaporator and the bubbling bed preheater.

* * * * *